(12) United States Patent
Jacobi et al.

(10) Patent No.: US 10,691,412 B2
(45) Date of Patent: Jun. 23, 2020

(54) PARALLEL SORT ACCELERATOR SHARING FIRST LEVEL PROCESSOR CACHE

(71) Applicant: International Business Machines Corporation, Armonk, NY (US)

(72) Inventors: Christian Jacobi, West Park, NY (US); Aditya Puranik, Pune (IN); Martin Recktenwald, Schoenaich (DE); Christian Zoellin, Weinstadt (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/118,582

(22) Filed: Aug. 31, 2018

(65) Prior Publication Data

US 2020/0073633 A1  Mar. 5, 2020

(51) Int. Cl.
| | | |
|---|---|---|
| *G06F 7/08* | (2006.01) | |
| *G06F 7/16* | (2006.01) | |
| *G06F 7/02* | (2006.01) | |
| *G06F 9/50* | (2006.01) | |

(52) U.S. Cl.
CPC ............ *G06F 7/16* (2013.01); *G06F 7/02* (2013.01); *G06F 7/08* (2013.01); *G06F 9/5027* (2013.01)

(58) Field of Classification Search
CPC ............ G06F 7/60–08; G06F 7/22–26; Y10S 707/99937
See application file for complete search history.

(56) References Cited

U.S. PATENT DOCUMENTS

| | | | |
|---|---|---|---|
| 5,287,494 A | 2/1994 | Garcia et al. | |
| 5,487,166 A | 1/1996 | Cossock | |
| 6,385,612 B1 | 5/2002 | Troisi | |
| 9,268,863 B2 | 2/2016 | Buyuktosunoglu et al. | |
| 9,396,143 B2 | 7/2016 | Buyuktosunoglu et al. | |
| 9,405,538 B2 | 8/2016 | Ioffe et al. | |
| 9,619,500 B2 | 4/2017 | Asaad et al. | |
| 9,721,007 B2 | 8/2017 | Zhang et al. | |
| 9,766,888 B2 | 9/2017 | Gueron et al. | |
| 2015/0046478 A1* | 2/2015 | Asaad ................. | G06F 16/2246 707/753 |

(Continued)

OTHER PUBLICATIONS

IBM "List of IBM Patents or Patent Applications Treated as Related; (Appendix P)", Filed Sep. 4, 2018, 2 pages.

(Continued)

*Primary Examiner* — Matthew D Sandifer
(74) *Attorney, Agent, or Firm* — Cantor Colburn LLP; William Kinnaman

(57) ABSTRACT

A computer processor includes a memory unit, a processor cache and a hardware merge sort accelerator. The memory unit stores key values to be sequentially sorted. The processor cache obtains tree data from the memory unit indicating the key values. The hardware merge sort accelerator is configured to generate a master tournament tree based on the key values and perform a tournament sort that determines a first winning key value based on the master tournament tree. The hardware merge sort accelerator further speculates a second winning key value based on the master tournament tree. The speculated second winning key value is a next sequential winning key value of the tournament sort.

17 Claims, 26 Drawing Sheets

(56) References Cited

U.S. PATENT DOCUMENTS

2016/0188644 A1    6/2016  Sukhwani et al.

OTHER PUBLICATIONS

Jacobi et al., "Adaptive Sort Accelerator Sharing First Level Processor Cache," U.S. Appl. No. 16/118,592, filed Aug. 31, 2018.
Jacobi et al., "Transmission of a Message Based on a Determined Cognitive Context," U.S. Appl. No. 16/118,560, filed Aug. 31, 2018.
Zhang et al., "High throughput large scale sorting on a CPU-FPGA heterogeneous platform," Computer Engineering Technical Report No. CENG-2015-10, Jan. 2016 (9 pages).
Iyer, Balakrishna R. "Hardware assisted sorting in IBM's DB2 DBMS." International Conference on Management of Data, COMAD 2005b. 2005 (9 pages).
Sukhwani et al., "A hardware/software approach for database query acceleration with FPGAs" Int J Parallel Prog (2015)43:1129-1159.
List of IBM Patents or Patent Applications Treated as Related; (Appendix P), Filed Jan. 2, 2020; 2 pages.
Jacobi et al., "Transmission of a Message Based on a Determined Cognitive Context," U.S. Appl. No. 16/718,419, filed Dec. 18, 2019.

\* cited by examiner

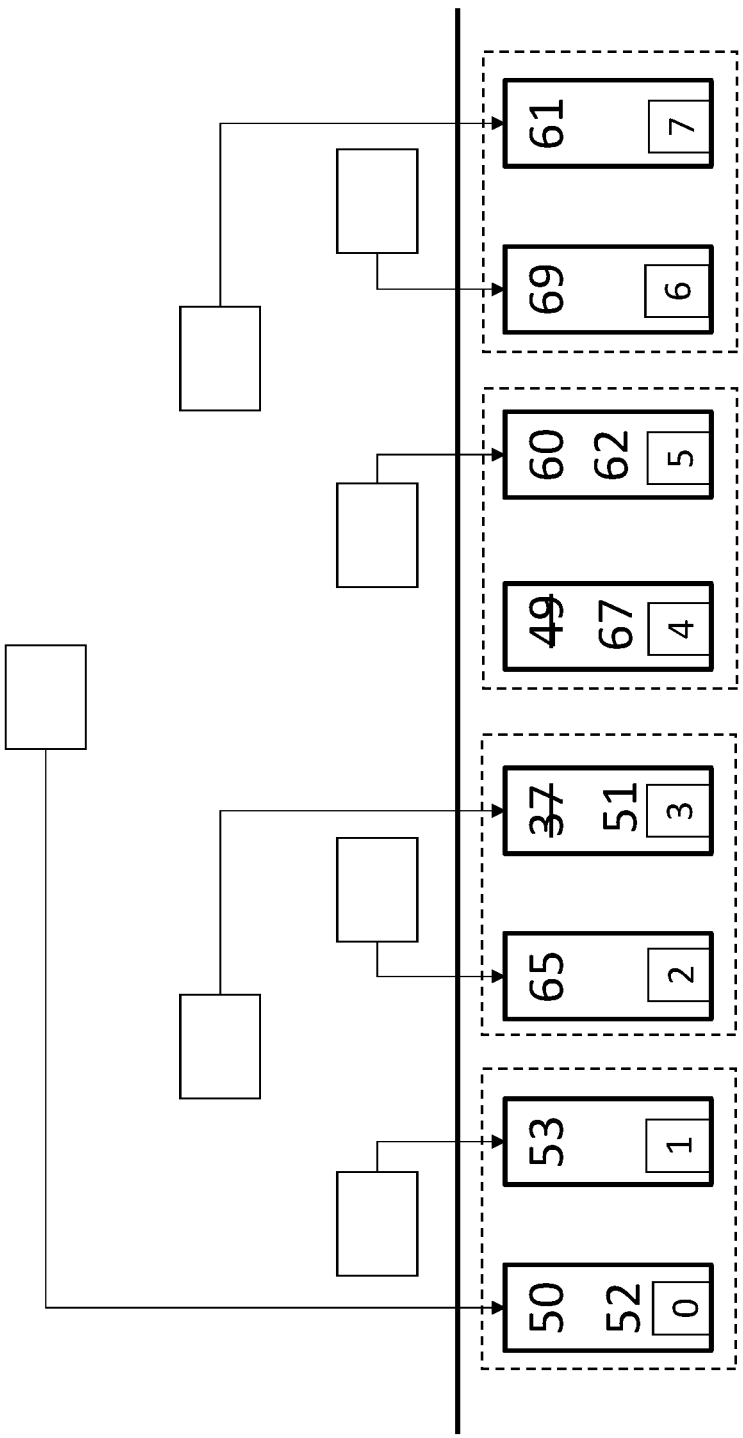

PARALLEL SORT ACCELERATOR SHARING FIRST LEVEL PROCESSOR CACHE

BACKGROUND

The present invention generally relates to computing systems, and more specifically, to sort accelerators configured to sort data records of a computer processor.

Computing systems are widely used to process and sort data records stored in a database. A variety of sorting algorithms have been developed to reduce sorting time for improving the processing performance of the computing system. Once such sorting algorithm is referred to as tournament tree sort.

In general, a tournament tree sort is a binary-tree based selection and replacement sort algorithm. Tournament tree sort algorithms allow sorting of keys associated with a data record in a continuous streaming fashion. Incoming keys are entered into the leaf nodes and the keys exit, in sorted order, from the tree's root node. For a set of input records that are initially populated into the leaf nodes, pair-wise comparisons (i.e., individual games or matches) are performed at each tree level until a winning record emerges at the tree root. After the initial round of comparisons and populations, each non-leaf node holds exactly one input key, except the winning key which is sent out of the tree. During a continuous sort, after a winner is removed from the tree, a new input record is inserted at the previous winner's leaf node and is compared (and swapped, if needed) with exactly one non-leaf node at each level, until the tree root is reached and the new winner is determined.

One variation on the conventional tournament tree sort algorithm is referred to as a "parallel sort tournament tree", which performs two separate tournaments at the same time, i.e. simultaneously. For instance, the system generates two separate and individual tournament trees and performs independent tournaments for each respective tree. The winner of each tournament is then "merged" together and sorted.

SUMMARY

According to a non-limiting embodiment, a computer processor includes a memory unit, a processor cache and a hardware merge sort accelerator. The memory unit stores key values to be sequentially sorted. The processor cache obtains tree data from the memory unit indicating the key values. The hardware merge sort accelerator is configured to generate a master tournament tree based on the key values and perform a tournament sort that determines a first winning key value based on the master tournament tree. The hardware merge sort accelerator further speculates a second winning key value based on the master tournament tree. The speculated second winning key value is a next sequential winning key value of the tournament sort.

According to another non-limiting embodiment, a computer-implemented method is provided to sort a plurality of data values stored in a hardware computer processor. The method comprises storing, in a memory unit of the computer processor, key values to be sequentially sorted with respect to one another, and obtaining, via a processor cache, tree data from the memory unit indicating the key values. The method further comprises generating, via a hardware merge sort accelerator, a master tournament tree based on the key values; and generating, via the merge sort accelerator, a master tournament tree based on the key values. The method further comprises performing, via the merge sort accelerator, a tournament sort that determines a first winning key value based on the master tournament tree and speculates a second winning key value based on the master tournament tree. The speculated second winning key value is a next sequential winning key value of the tournament sort.

According to yet another non-limiting embodiment, a computer program product is provided to control an electronic computer processor to sort data. The computer program product comprises a computer readable storage medium having program instructions embodied therewith. The program instructions are executable by the electronic computer processor to perform operations comprising storing, in a memory unit of the computer processor, key values to be sequentially sorted with respect to one another, and obtaining, via a processor cache, tree data from the memory unit indicating the key values. The method further comprises generating, via a hardware merge sort accelerator, a master tournament tree based on the key values; and generating, via the merge sort accelerator, a master tournament tree based on the key values. The method further comprises performing, via the merge sort accelerator, a tournament sort that determines a first winning key value based on the master tournament tree and speculates a second winning key value based on the master tournament tree. The speculated second winning key value is a next sequential winning key value of the tournament sort.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2L illustrates the state of the master list following the final update illustrated in FIG. 2K according to a non-limiting embodiment;

FIG. 2O illustrates a final update following completion of the transition tournament according to a non-limiting embodiment;

Figure 1:
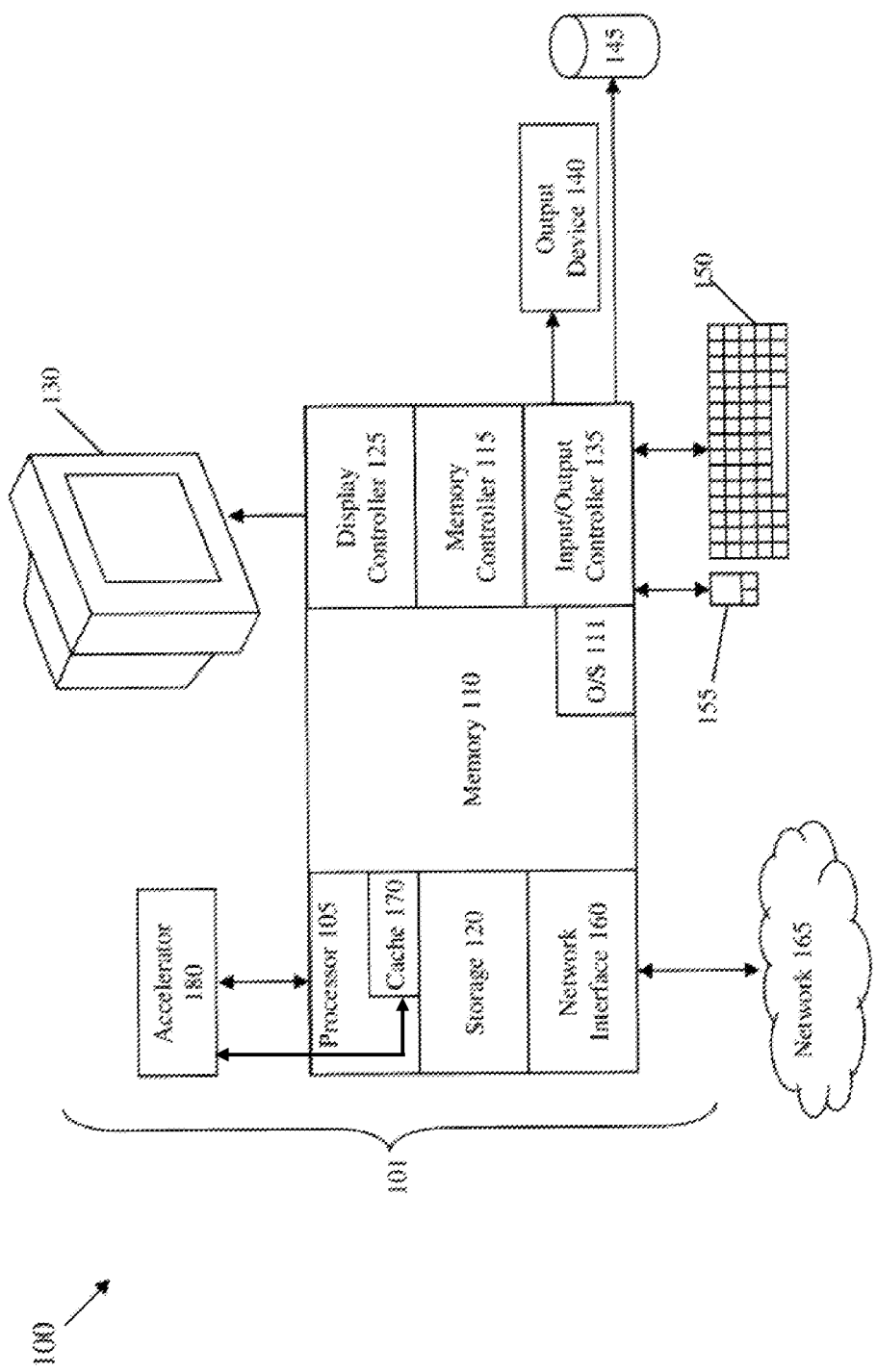
FIG. 1 depicts a block diagram of a computer system capable of performing the teachings described herein according to a non-limiting embodiment.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

The term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

Additionally, the term "match" refers to a comparison between two keys included in a given tournament sort tree. The term "winner" refers to the key that moves forward to participate in a following "match." In a "highest-winner" tournament scheme, the higher value key participating in the "match" is deemed the "winner" and moves forward to participate in a match higher up the tree, i.e., in the next "match". In a "lowest-winner" tournament scheme, however, the lower value key participating in the "match" is deemed the winner and advances to the next "match", i.e., proceeds to the next higher level of the tree.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, computing systems include a hardware processor core, which employs a merge sort accelerator. The merge sort accelerator is a hardware component that facilitates various sort algorithms including, for example, a tournament tree sort algorithm. A traditional tournament sort algorithm executes individual "matches" by comparing full keys against one another. The tree itself stores the losers of a prior tournament, when a new element is chosen from a list and enters the tournament, it is compared against existing losers in order to determine whether it is smaller or larger. The winning key (e.g., the smallest key) is stored, the tree list is updated, and the process proceeds to the next level of the tree, i.e., the next "match", to compare another full key that emerges from the list that the winner was chosen from.

Traditional tournament tree sort algorithms require that the conventional merge sort accelerator itself employ large individual buffers to store records associated with a sort tree, along with the data indicating the losers and/or winners of the tournament. To perform the "matches" for determining the losers/winners, several comparators are employed with the merge sort accelerator to facilitate the pair-wise comparisons of the keys. As the size of the sort tree and/or individual keys increases, however, the available buffer space of the merge sort accelerator decreases and the sort runtime increases. It may also be necessary to increase the number of comparators included in the merge sort accelerator, thereby increasing cost on required processing power.

Turning now to an overview of the aspects of the invention, one or more embodiments of the disclosure address the shortcomings described above by employing a computer system that performs a parallel tournament sort scheme in a partial compare tournament sort to sequentially sort a list of key data values using a single master tournament tree. A partial compare tournament sort is referred to herein as a tournament sort that partially processes subsets of keys participating in a tournament iteratively by performing multiple "passes" (i.e., sort runs) through a "master" tournament tree before determining the overall winner of the tournament, i.e., the winning key value used to perform the final update of a given tournament. The partial compare tournament obtains intermediate data about the keys resulting from a first pass through the tournament tree before determining the ultimate winner following a second pass through the tournament tree. In at least one embodiment, the partial sort can be achieved by performing tournaments on a digit by digit basis. A digit can be of the base 10, but in computer systems will typically be chosen to be a high power of 2 (e.g. 2^64) matching the data bus size of the computer system.

In at least one embodiment, the partial sort performs a first tournament that compares a first digit in a first place holder (e.g., the "tens" place holder) of a first key with a second digit located in the first place holder (e.g., the "tens" place holder) of a second key, and then performs a second tournament that compares a second digit located in a second place holder (e.g., the "ones" place holder) of the first key with a second digit located in the second place holder (e.g., the "ones" place holder) of the second key. Accordingly, the partial tournament sort according to various embodiments described herein (e.g., performing a partial tournament sort on a digit-by-digit basis) requires only a small number of bytes, equivalent to the data bus width of the data cache, be stored in the accelerator to avoid the penalty of repeatedly reading the winner's data. In this manner, the load on the load on the cache attached to the accelerator is reduced thereby improving the performance and speed of the overall computer system.

In at least one embodiment, the computer system includes a parallel sort accelerator that utilizes a single master tournament tree to determine an overall winning key value of an initial partial tournament sort, while also simultaneously determining a speculated "top contender" key value that is speculated to be the next key value to be sequentially sorted with respect to the overall winning key value from the initial partial tournament sort. In this manner, a parallel tournament sorting scheme can be achieved without the need to store excessive data associated with multiple separate tournament trees.

In addition, the computer system provides a merge sort accelerator that leverages the existing cache of the computing system to execute a partial compare tournament sort. Instead of storing all the keys of the tournament's losers in the memory of the individual accelerator, at least one embodiment stores a portion of the tournament source data (a single digit), e.g., only the winner of a particular match, in the accelerator. When all losers have been compared for a first digit, the winning digit stored in the accelerator and that data can be stored to the output without having to retrieve it from the processor cache again. And even if the winner is ambiguous due to a tie on the prefix of digits processed up to that point the winner data itself is unambiguous due to being equal by definition.

Referring now to FIG. 1, a block diagram of an exemplary computer system 100 for use with the teachings herein is shown. The methods described herein can be implemented in hardware software (e.g., firmware), or a combination thereof. In an exemplary embodiment, the methods described herein are implemented in hardware and is part of the microprocessor of a special or general-purpose digital computer, such as a personal computer, workstation, minicomputer, or mainframe computer. The system 100, therefore, includes general-purpose computer 101.

In an exemplary embodiment, in terms of hardware architecture, as shown in FIG. 1, the computer 101 includes a processor 105, memory 110 coupled via a memory controller 115, a storage device 120, and one or more input and/or output (I/O) devices 140, 145 (or peripherals) that are communicatively coupled via a local input/output controller 135. The input/output controller 135 can be, for example, but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The storage device 120 may include one or more hard disk drives (HDDs), solid state drives (SSDs), or any other suitable form of storage.

The processor 105 is a computing device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macro processor, or generally any device for executing instructions. The processor 105 may include a cache 170, which may be organized as a hierarchy of more cache levels (L1, L2, etc.).

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example, but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as Wi-Fi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the storage devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions. In exemplary embodiments, the computer system 100 includes one or more accelerators 180 that are configured to communicate with the processor 105. The accelerator 180 may be a field programmable gate array (FPGA), an application-specific integrated circuit (ASIC), or other suitable device that is configured to perform specific processing tasks. In exemplary embodiments, the computer system 100 may be configured to offload certain processing tasks to an accelerator 180 because the accelerator 180 can perform the processing tasks more efficiently than the processor 105.

A tournament tree algorithm allows continuous sorting of streaming input keys. Tournament trees with N leaf nodes guarantee a minimum sorted run of size N, although much larger sorted runs can usually be achieved, with typical run sizes being 2N. For each new key inserted into the tree, the tournament tree algorithm requires only one comparison at each of the log(N) levels of the tree, since the comparisons are made along a known path to the root. This characteristic allows the entire tree to be served with a single comparator, with a throughput of 1 key sorted per log(N) cycles.

In general, the implementation of a tournament tree sort includes multiple levels from the beginning to the end of a sorting run, sometimes referred to as a sorting "pass". A single pass is viewed as completing each match included in a tournament of the tree. During an initial setup phase, an initial set of keys are first input into the tournament tree, which populates the leaf nodes of the tournament tree. The keys can be inserted serially and all comparisons (i.e., matches) performed during the tournament can be made using a single comparator, evaluating the comparisons for all the levels of the tournament tree.

A second phase, referred to as the evaluation phase, includes evaluating the remaining levels of the tournament tree and performing sorting after the leaf nodes are fully populated. In a conventional tournament tree sort, the evaluation phase can add to the cost of sorting the tournament tree after the last key from the initial set of keys is inserted. Since all the keys are available at this time and since the comparisons are being done across one level of the tree at a time, this process can be easily pipelined, with one comparison being performed every cycle.

A third phase includes a continuous sorting phase. During the continuous sorting phase, incoming new keys are inserted into the leaf node of the previous winner and proceed up the tree (i.e., to the next level) following the path of the previous winner. At each level, the value of the new key is compared with the value at the internal node and either the current winner is kept or the key is swapped at that node. In exemplary embodiments, each new key that is inserted results in the next sorted key being emitted from the tree.

A fourth phase includes a flush phase, which occurs when no more keys to be sorted are added to the tree. The flush phase may include inserting dummy keys, which are guaranteed to be the smallest/largest possible key, into the tree and flushing the remaining valid keys. Since the dummy keys are the smallest/largest possible key, they always lose in the comparisons and thus do not emerge as winners until all the remaining valid keys have been flushed from the tree. At this point, all the valid keys have been sorted and the sort operation is complete.

Unlike a conventional tournament tree sorting scheme, at least one embodiment described herein includes a merge sort accelerator that performs a partial compare tournament sort. The merge sort accelerator can be constructed as an individual hardware processor configured to sort data values (e.g., keys) stored in a separate main hardware processor included in the computer system. The system executes one or more partial compare tournament sorts that performs multiple "passes" (i.e., sort runs) through a tournament tree 200 before determining the overall winner of the tournament. The match results of each pass are off-loaded and stored in the cache 170 and are later retrieved to perform comparisons to determine the overall winner of the tournament.

Figure 2A:
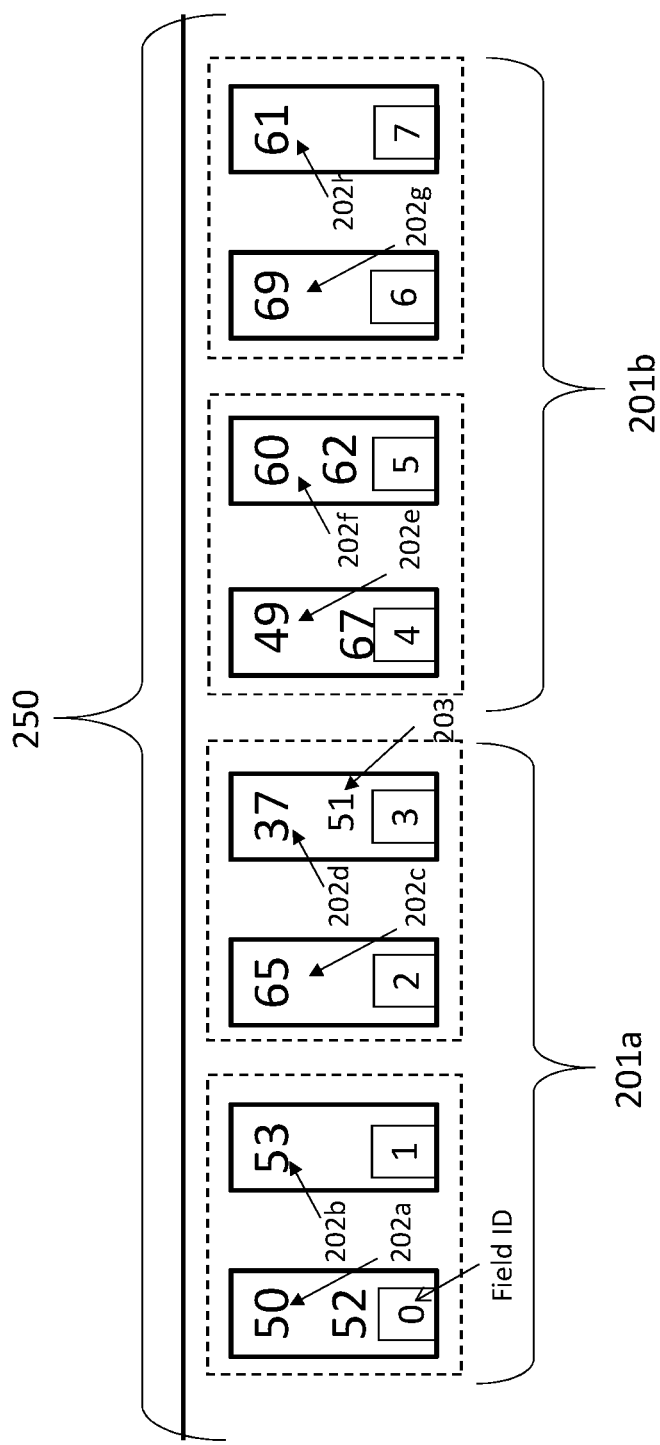
FIG. 2A illustrates an input list including a list of key values to be sorted according to an initial partial compare tournament sort executed by the computer system illustrated in FIG. 1 according to a non-limiting embodiment.

Turning to FIG. 2A, an input list 250 utilized to perform a tournament tree sort is illustrated according to a non-limiting embodiment. The input list 250 includes a list of key values to be compared and sorted. Individual data fields 0-7 with a respective key 202a-202h to define a "master" tournament tree list 250. In at least one non-limiting embodiment, the keys 202a-202h include double words (DWs), where each DW defines an individual digit of the key. It should be appreciated that the decimal digits are described herein as an example, but that any granularity of bytes out of the total key which can be compared/processed to achieve a comparison for smaller/equal/larger may be implemented. That is, the DW refers to the number of the "s byte" word that is processed in each key 202a-202h.

Figure 2B:
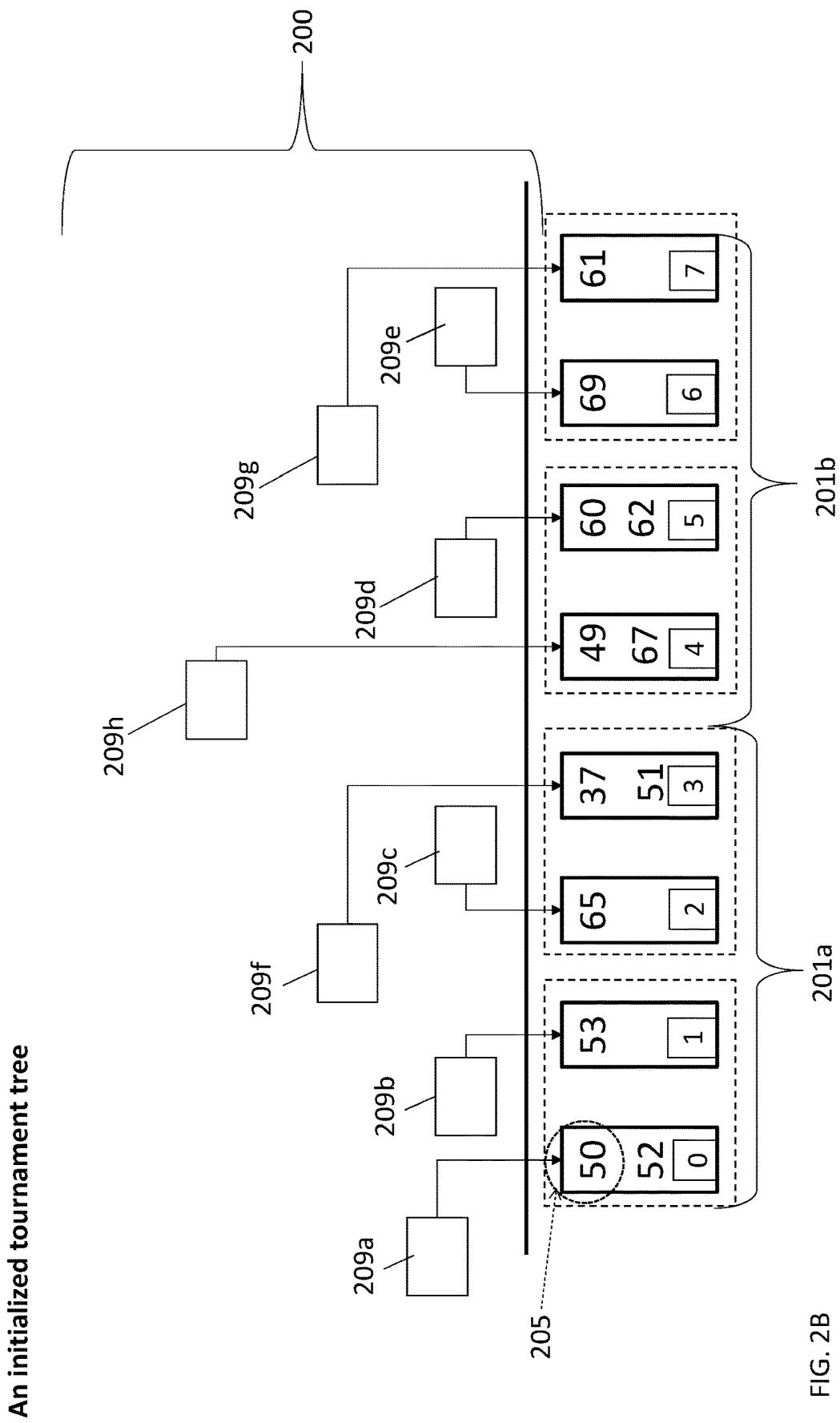
FIG. 2B illustrates initialization of a master tournament tree based on a current key value selected from the input list of FIG. 2A according to a non-limiting embodiment.

At FIG. 2B, a "master" tournament tree 200 is initialized. The tree 200 can be divided in half where a left side 201a of the tree 200 includes a first half of the total keys 202a-202h participating in a tournament and the right side 210b of the tree 200 includes the second half of the total keys 202a-202h participating the tournament. Individual matches will be played out at respective nodes 209a-209h of the tree 200.

A current key 205 (e.g., 50) is selected to be sorted among the keys 202a-202h included in the master tournament tree list 250 according to a tournament sort. In terms of DWs, a first DW defines the first digit (e.g., "5"), while a second DW defines the second digit (e.g., "0"). Pairs of keys 202a-202h are then compared to one another to perform individual "matches". Multiple passes through the tournament tree are performed before determining the overall winner of the tournament. The selected key 250 is therefore sorted based on its performance (i.e., win or loss results) in the tournament.

Figure 2C:
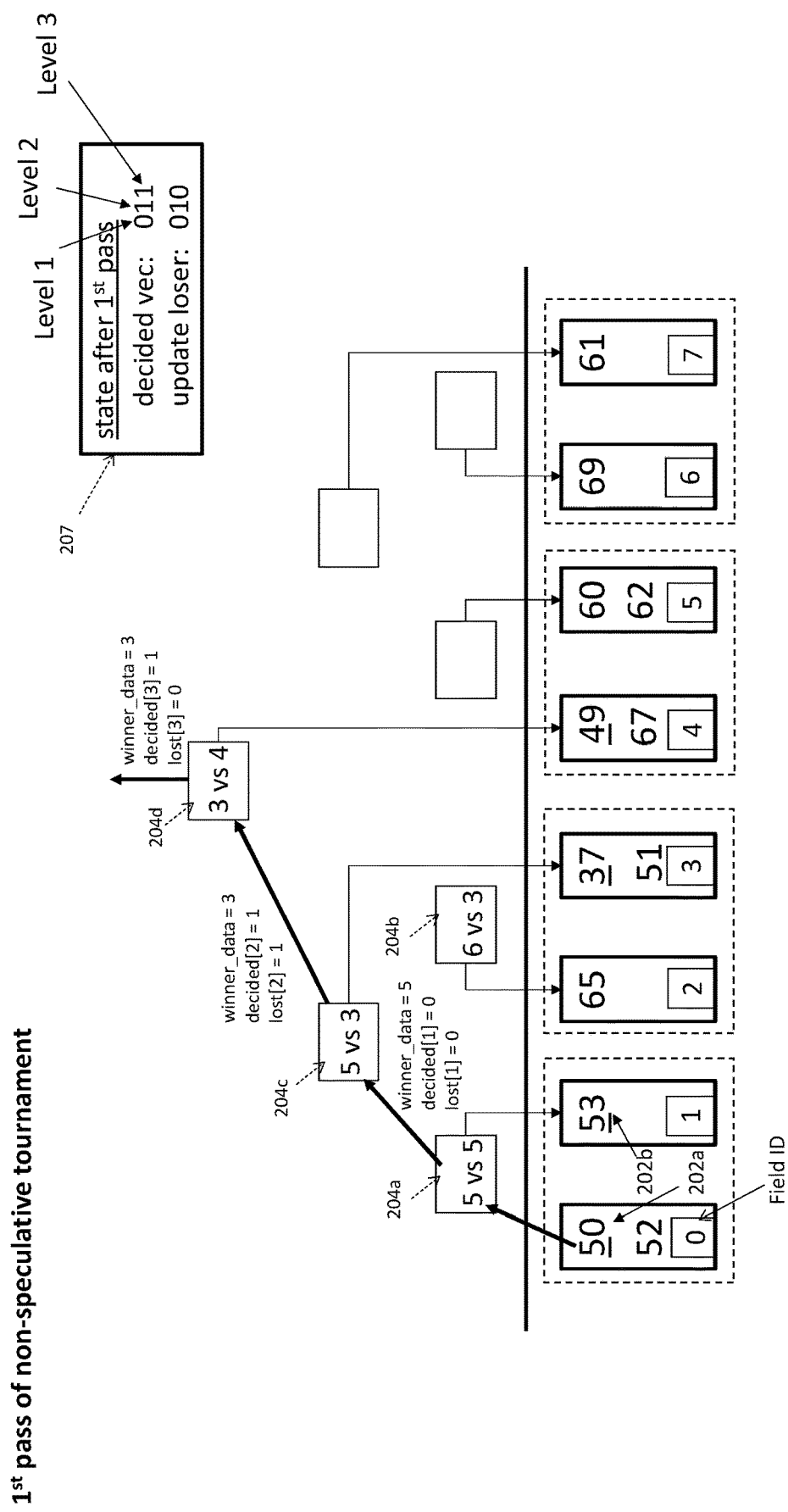
FIG. 2C depicts a first pass of the current key value participating in a first non-speculative tournament sort according to a non-limiting embodiment.

FIG. 2C illustrates a first pass of the currently selected key 205 (e.g., 50) according to a non-limiting embodiment. At this stage, the tournament is referred to as a "non-speculative" tournament. The first pass performs individual matches 204a-204d. The number of individual matches is based on the size of the master tournament tree 200. In this case, the tournament tree sort operates under a "lowest-winner style tournament," also referred to as a "loser-based tournament tree". In a lowest-winner style tournament, the lowest DW (e.g., digit of a key) competing in a match is deemed the winner and moves on to the next round, i.e., advances to the next level or next node of the tree 200.

Each match 204a-204d performed during the first pass compares a first digit located in a first place holder (e.g., the "tens" place holder) of the current selected key 205 (e.g., "50") with a second digit located in the first place holder (e.g., the "tens" place holder) of a second key. The winner (e.g., "3") of match 204d is deemed the winner of the first pass and is stored in the main memory 110 of the processor.

In some scenarios, a "tie" can occur during the first pass, i.e., the same value of each key may be compared in a given match. For example, match 204a is deemed a tie because both keys (e.g., 50 and 53) have the same value, i.e., a matching first digit being "5". In this scenario, the value of the matching digit (e.g. 5) advances to the next match (i.e., 204b), and the winner of the tied match (204a) is determined in the following pass, i.e., in the second pass of the non-speculative tournament.

In order to support processing a tournament, digit by digit binary state 207 is retained across partial tournaments for the current selected key 205. One or more binary state vectors 207 are also assigned to the current selected key 205 to be sorted. The binary state vector 207 includes a "decided state" binary vector (DV) and a "loser state" binary vector (UL). Each binary vector 207 includes a value corresponding to the rounds or levels of the master tournament tree 200. Thus, a master tournament tree 200 including three rounds or three levels to determine a winner will include a binary state vector 207 including a 3-bit "decided state" binary vector and a 3-bit "loser state" binary vector. In the example illustrated in FIG. 2C, the decided state" binary vector reads "011" after the first pass.

For instance, during the first round, a tie occurred between 5 (e.g., "50") and 5 (e.g., "53"). Thus, no decision occurred in the first round, and the first digit of the 3-bit "decided state" binary vector was set to "0". In the second round, however, "5" (e.g., "5X") lost to "3" (e.g., "37"). Thus, a decision (e.g., a win/loss) occurred in the second round, and the second digit of the binary vector was set to "1". In the third round, 3 (e.g., "37") was deemed the winner over 5 (e.g., "54"). Thus, a decision (e.g., a win/loss) occurred in the third round, and the third digit of the binary vector was set to "1".

The 3-bit "loser state" binary vector operates to indicate a level or round in which the currently selected key 205 realizes a loss, if at all. During the first round of the first pass, for instance, the currently selected key 205 (e.g. "50") realized a tie and therefore did not lose. Thus, the first digit of the 3-bit "loser state" binary vector was set to "0". However, the currently selected key 205 realized a loss in the second round (i.e., "5" was deemed a loser against 3). Therefore, the second digit of the 3-bit "loser state" binary vector was set to "1". Because currently selected key 205 did not advance to the third round, the third digit of the 3-bit "loser state" binary vector was set to "0". Accordingly, the 3-bit "loser state" binary vector corresponding to the currently selected key 205 (e.g. "50") following completion of the second pass reads "010".

Figure 2D:
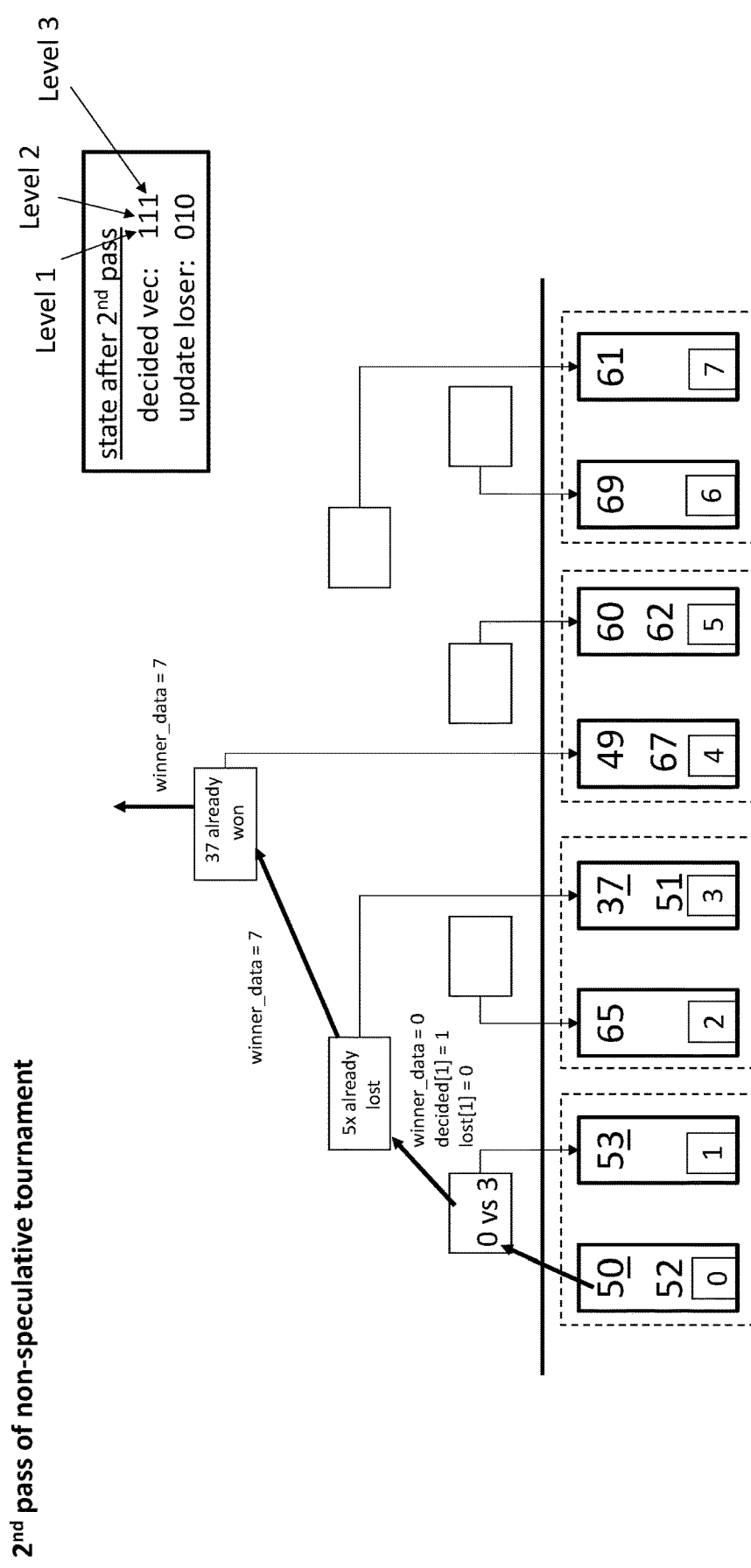
FIG. 2D depicts a second pass of the current key value participating in the first non-speculative tournament sort according to a non-limiting embodiment.
Figure 2E:
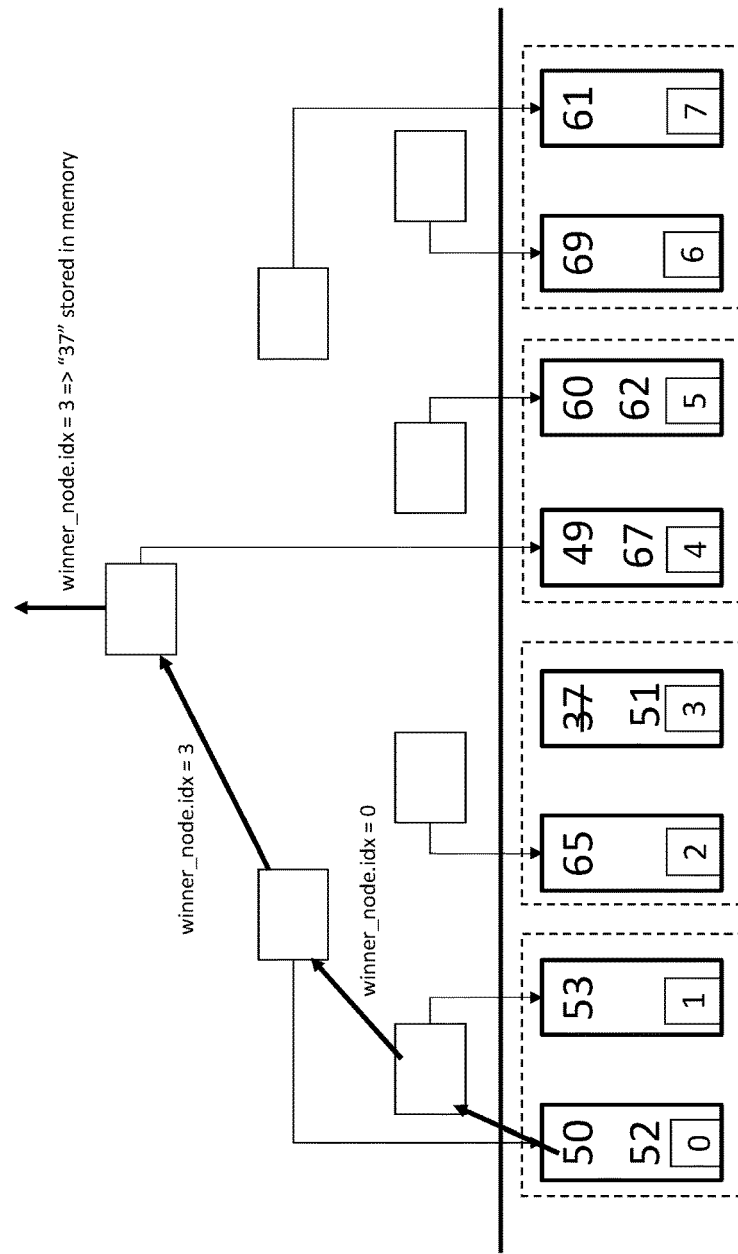
FIG. 2E depicts a final update of the most-recent non-speculative tournament according to a non-limiting embodiment.
Figure 2F:
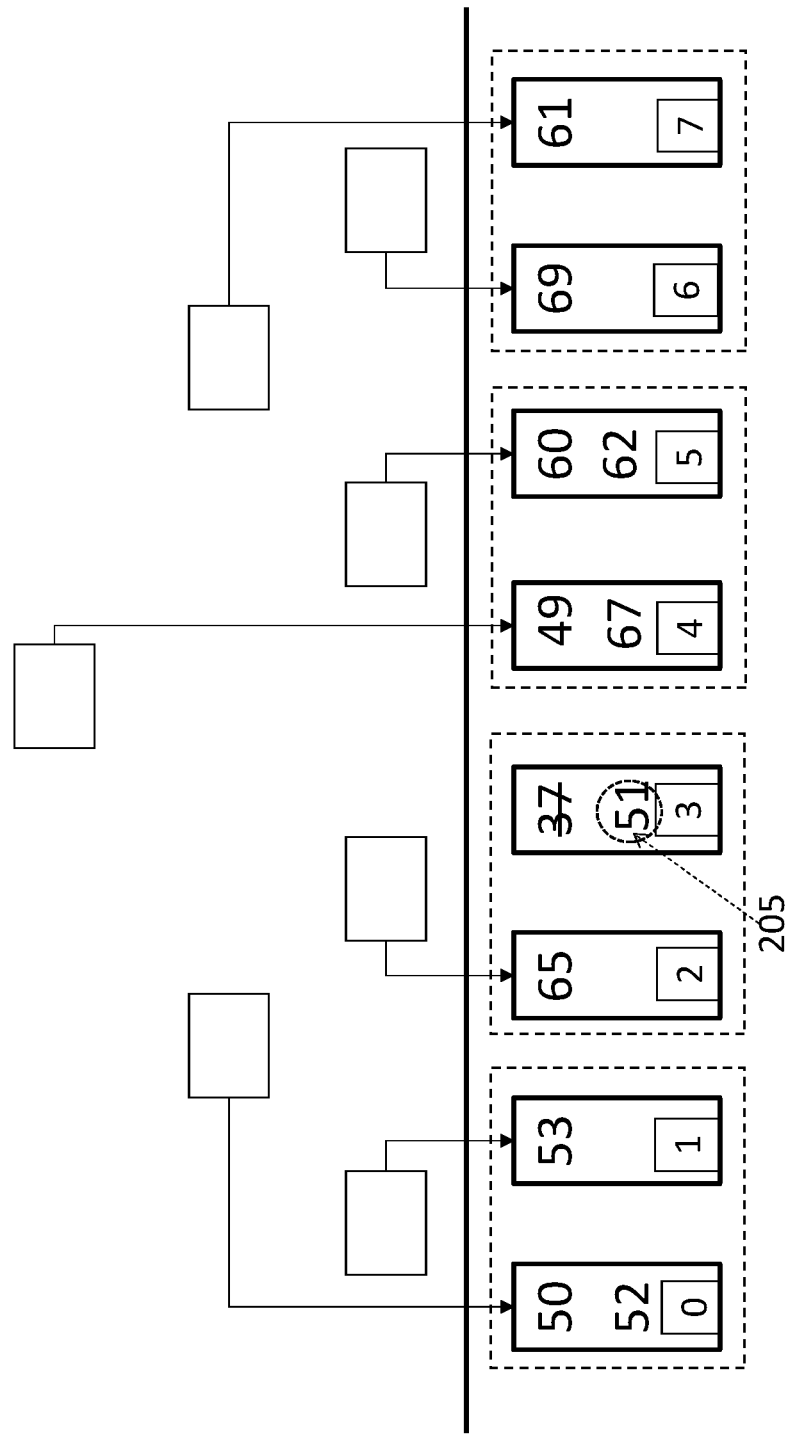
FIG. 2F depicts selection of the next key to be sorted according to a subsequent non-speculative tournament after determining the "overall winner" of the most-recent non-speculative tournament according to a non-limiting embodiment.

Turning now FIG. 2D, the first non-speculative tournament is illustrated following a second pass or iteration of individual matches. For instance, each match during the second pass compares a first digit located in a second place holder (e.g., the "ones" place holder) of the first key with a second digit in the second place holder (e.g., the ones place holder) of the second key. The winner of the second pass "7" indicates the "overall winner" (e.g., "37") of the tournament. Accordingly, the value "37" is sequentially stored in the main memory 110 as opposed to in the accelerator 180, and a final update of the recent non-speculative tournament is performed as illustrated in FIG. 2E. As shown in FIG. 2F, the key 203a following the "overall winner" (e.g. "51") is then selected as the next key value 205 to be sorted according to a subsequent second non-speculative tournament sort. In this manner, the runtime speed of the merge sort accelerator 180 is increased because less buffer space and processing operations of the merge sort accelerator 180 are required to store the results of the tournament. As a result, the performance and processing speed of the computing system is significantly improved.

The binary state vector 207 is also updated to read "111" according to the results of the second pass. For instance, a decision in the first round occurs because now a winner can be determined between key value "50" and key value "53". That is, "0" is less than "3" such that it is determined that "50" is the winner of "53". Accordingly, the first digit of the 3-bit "decided state" binary vector was set to "1". Therefore, the "decided state" vector is updated to read "111".

In scenarios where the total key values to be sorted are initially stored in a random non-sequential arrangement, the highest prior loser of a tournament sort (e.g., "49") will frequently originate from the opposite side of the tree (e.g., the right side 201b) with respect to the overall winner of the most recent tournament sort, and will 50% of the time be the next winning key immediately following the next tournament sort. Thus, the highest prior loser can be speculated as the "top contender" to be the next winner of the tournament sort. A parallel tournament sort can be performed simultaneously with respect to the non-speculative tournament, which utilizes the "top contender" from the previous tournament sort, along with a currently selected key value for the current parallel tournament sort.

Figure 2G:
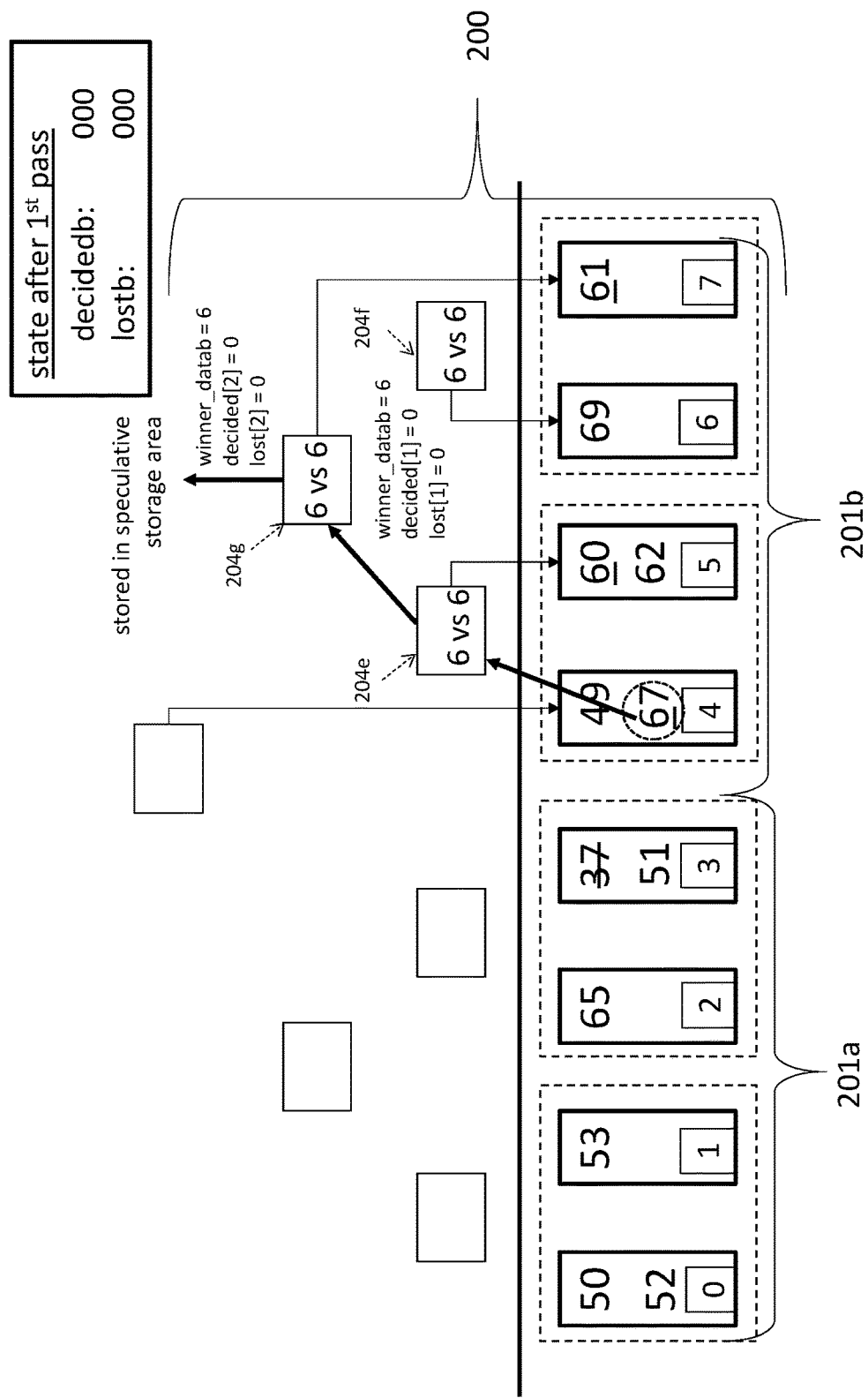
FIG. 2G illustrates a first pass of a currently selected key participating in a first speculative tournament according to a non-limiting embodiment.

For example, FIG. 2G illustrates a first pass of a currently selected key 205 (e.g., "67") participating in what is referred to as a first "speculative" tournament according to a non-limiting embodiment. As described above, the first pass of this speculative tournament is performed while performing the first non-speculative tournament, i.e., in parallel with the non-speculative tournament sort described in detail above (see FIGS. 2C-2F). In this example, the speculative tournament is performed using the right side of the tournament tree 200. Key "67" is the currently selected key because it is the next key value behind the runner-up value (e.g., "49") from the first non-speculative tournament.

Still referring to FIG. 2G, a tie occurs during the first pass because a comparison of the same value (e.g., "6") occurs during each match 240e-204g. In this scenario, the overall winner is determined in the following pass, i.e., in the second pass of the speculative tournament. Accordingly, FIG. 2G also shows each of the "decided state" binary vector (DV) and the "loser state" binary vector (UL) having values of "000".

Figure 2H:
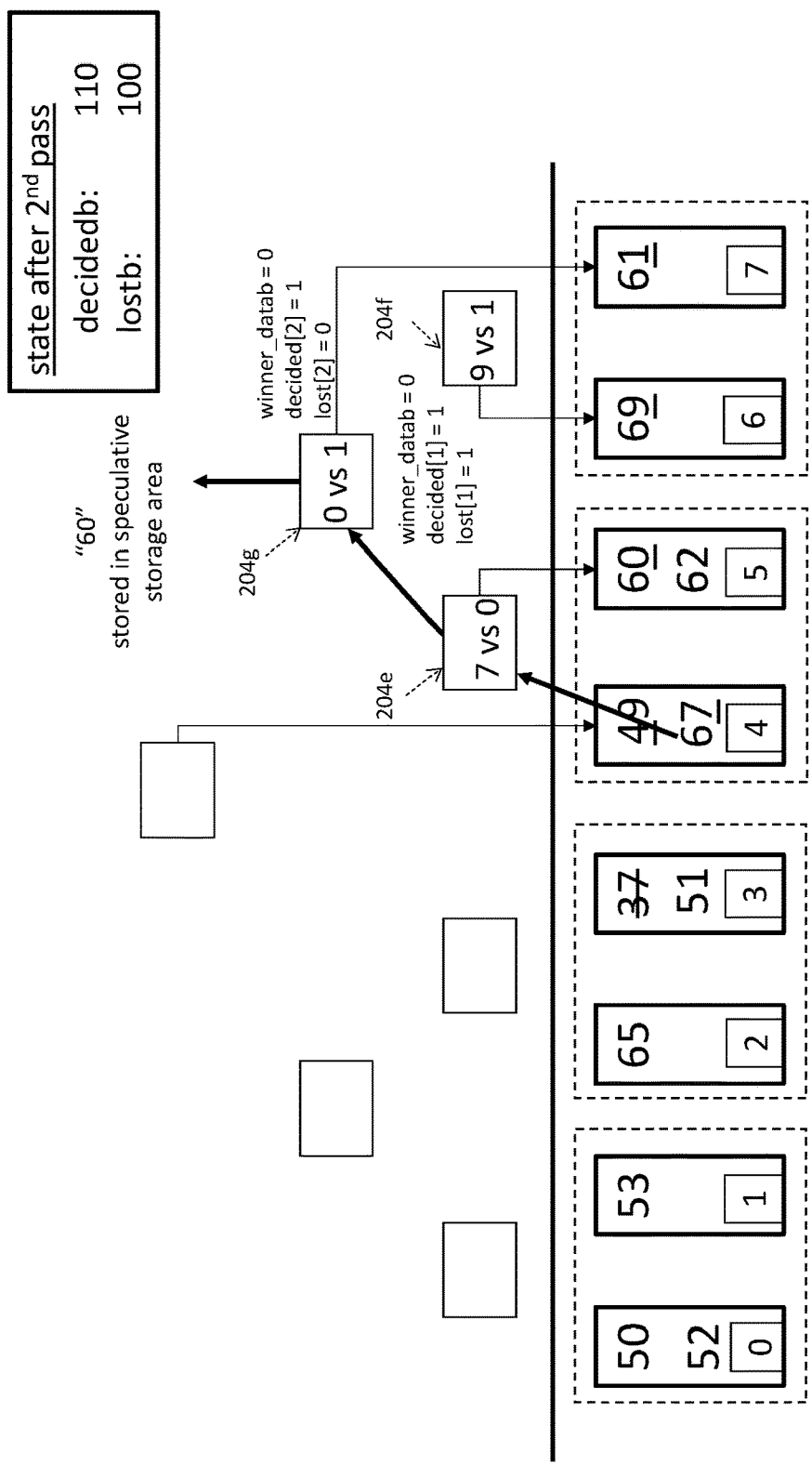
FIG. 2H illustrates a second pass of the currently selected key participating in the first speculative tournament according to a non-limiting embodiment.

Turning to FIG. 2H, a second pass of the currently selected key 205 (e.g., "67") participating in the first "speculative" tournament is illustrated. In this example, the winner of the second pass "0" (i.e., the winner of match 204g) indicates the "overall winner" (e.g., "60") of the tournament. Accordingly, the value "60" is sequentially stored in a separate memory area as opposed to in the accelerator 180.

In some scenarios, the outcome of the speculative tournament may not result in the next sequentially sorted key value (i.e., the next winner) as shown in FIG. 2H. That is, the outcome of the non-speculative tournament did not result in the top contender. For instance, the top contender (e.g., "49") did not ultimately win the tournament. Accordingly, the speculation that the immediate next winner would be from "49"'s side of the tree was incorrect. Nevertheless, the results of the speculative tournament can be stored in a speculative memory area (not shown) and subsequently compared to the winner of a subsequent non-speculative tournament.

Figure 2I:
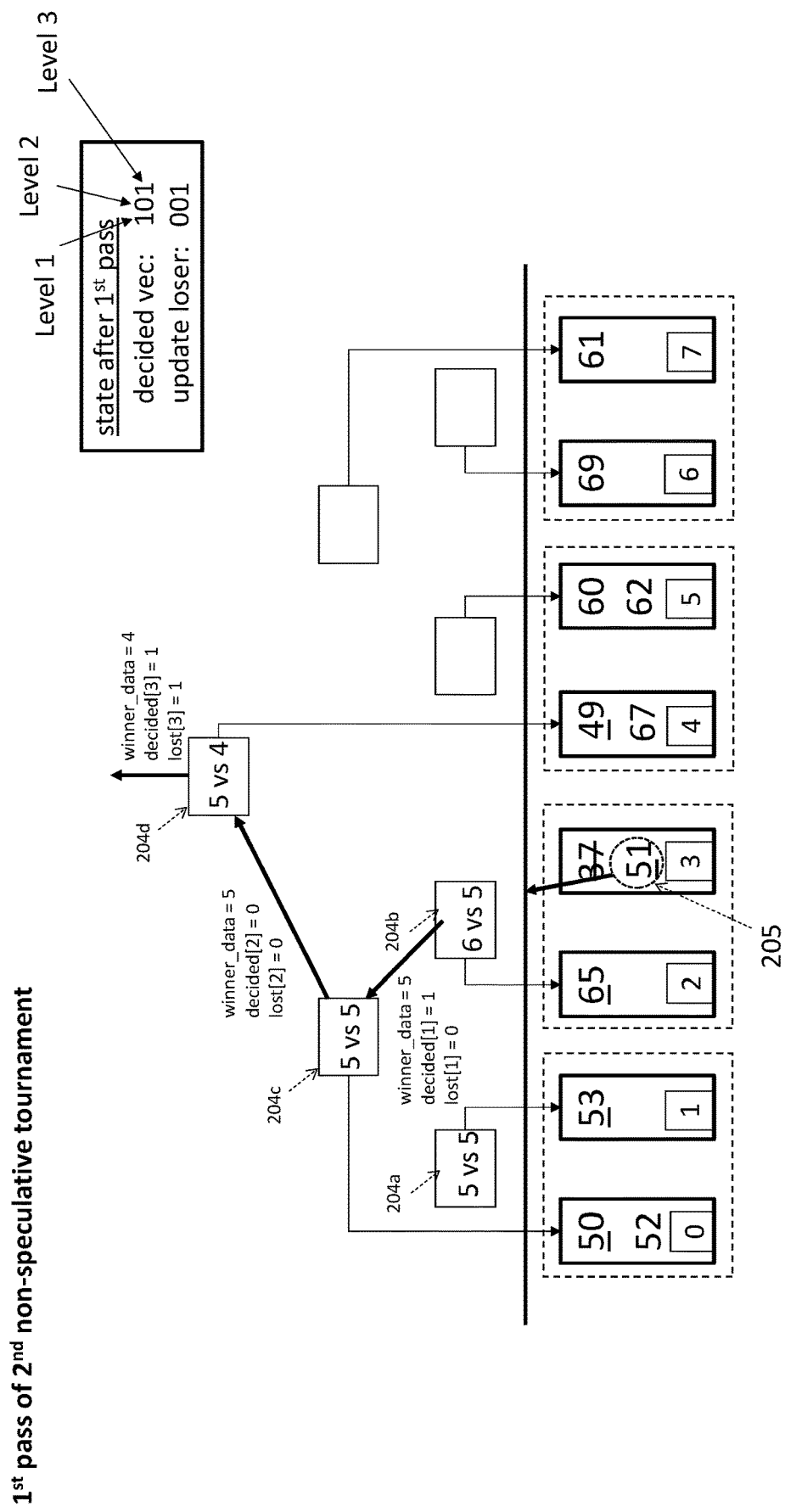
FIG. 2I illustrates a first pass of a subsequent non-speculative tournament according to a non-limiting embodiment.

Turning to FIG. 2I, for example, a first pass of a subsequent non-speculative tournament is illustrated according to a non-limiting embodiment. As described above, the key following the "overall winner" (e.g. "51") from the previous non-speculative tournament (see FIGS. 2C-2F) is selected as the next key value 205. Accordingly, the winner of first pass is determined to be "4" (i.e., "4" is the winner of match 204d).

Figure 2J:
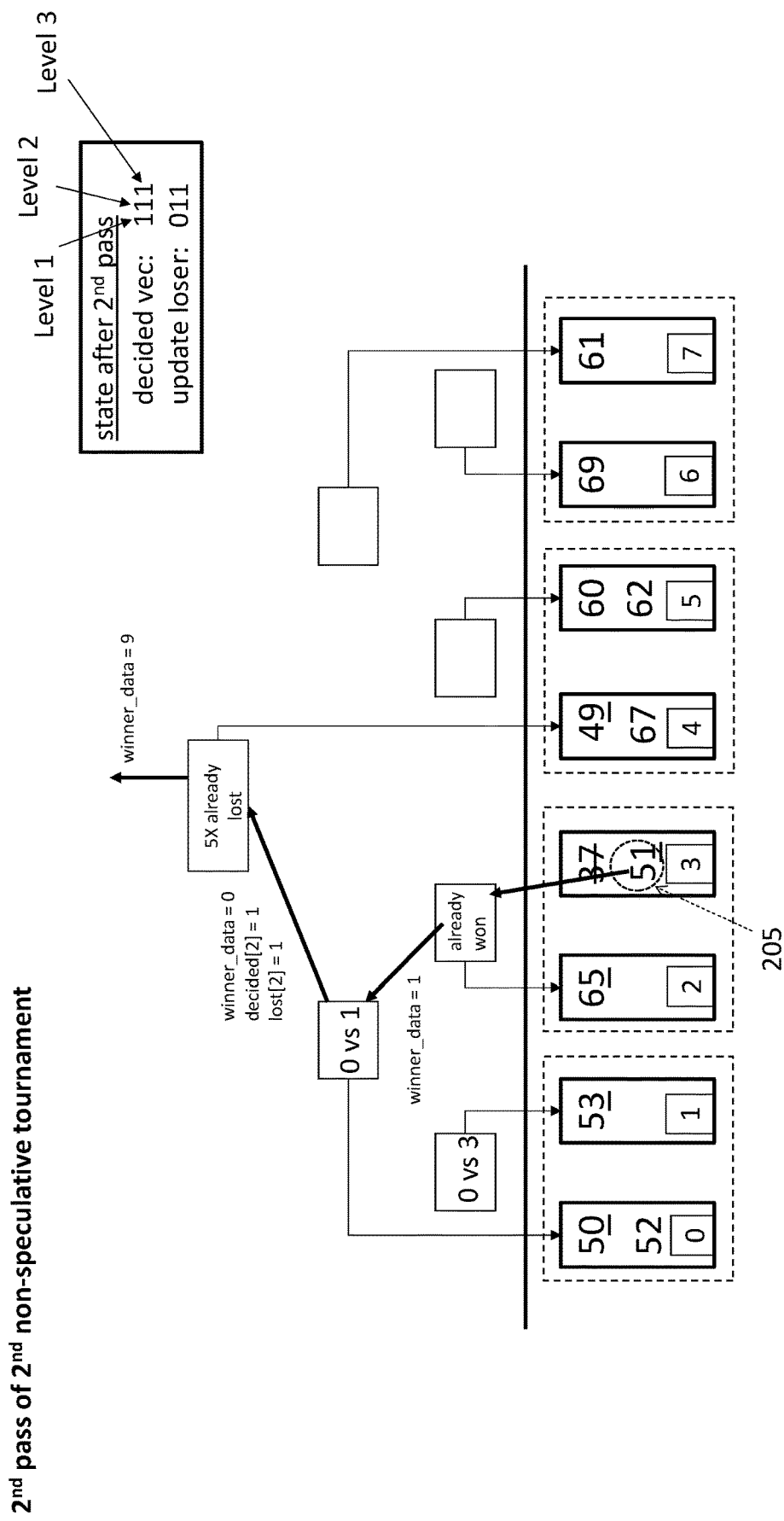
FIG. 2J illustrates a second pass of the subsequent non-speculative tournament according to a non-limiting embodiment.
Figure 2K:
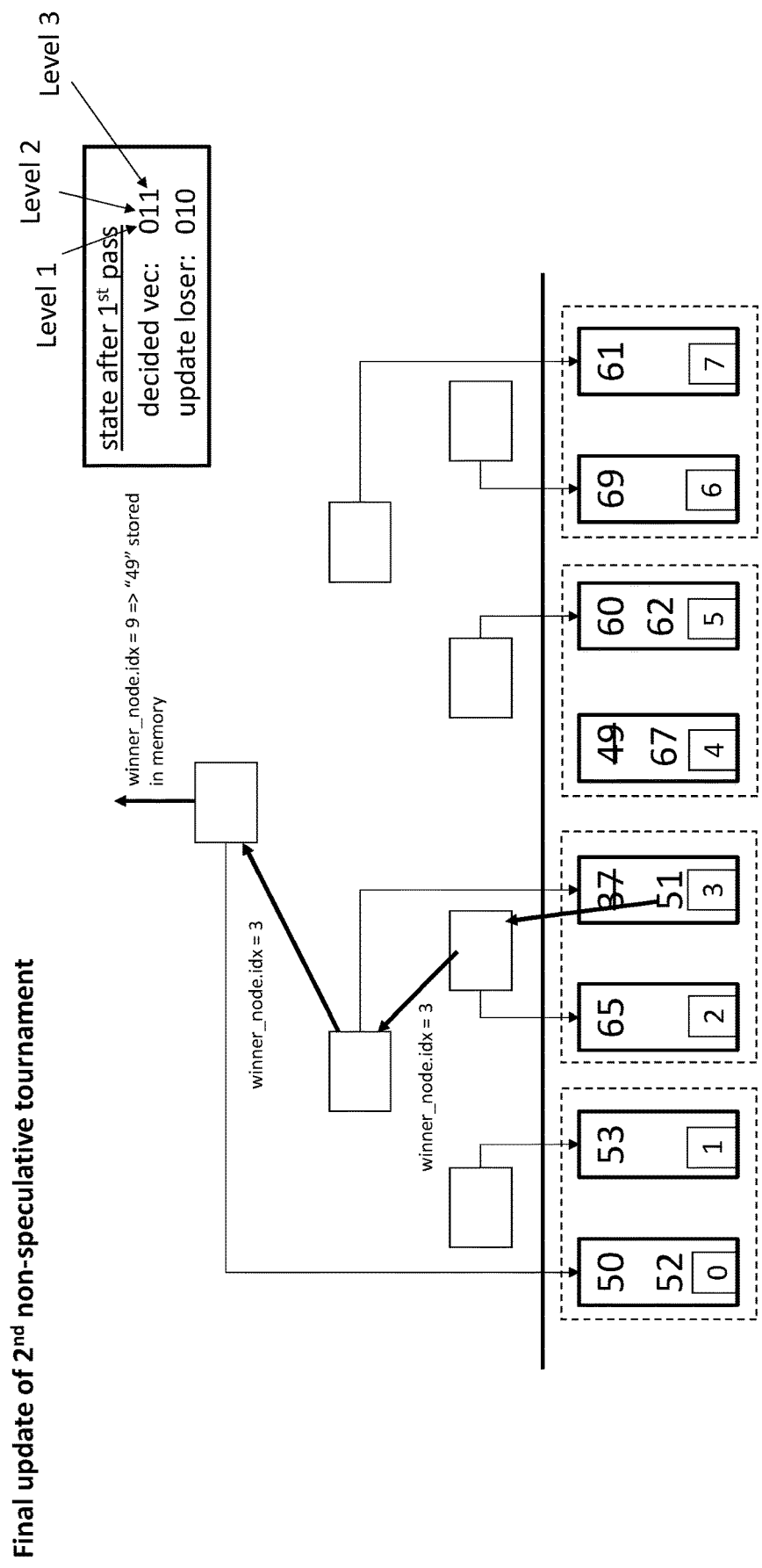
FIG. 2K illustrates a final update following completion of the subsequent non-speculative tournament according to a non-limiting embodiment.

At FIG. 2J, a second pass of a subsequent non-speculative tournament is illustrated. In this example, "49" is deemed the overall winner, while the "50" is determined as the highest looser. Accordingly, "49" is stored in memory and removed from the master list at FIG. 2K, and the pointer moves to field ID "0" to select "50" as the next key value to be sorted. The updated master list is illustrated at FIG. 2L.

As described above, the result of a previous speculative tournament can be stored in a speculative memory area (not shown) and subsequently compared to the highest loser of the subsequent non-speculative tournament (i.e., FIGS. 2I-2L). Accordingly, a tournament between the speculative winner 205a (e.g., "60") and the most recent highest loser 205b (e.g., "50") can be performed.

Figure 2M:
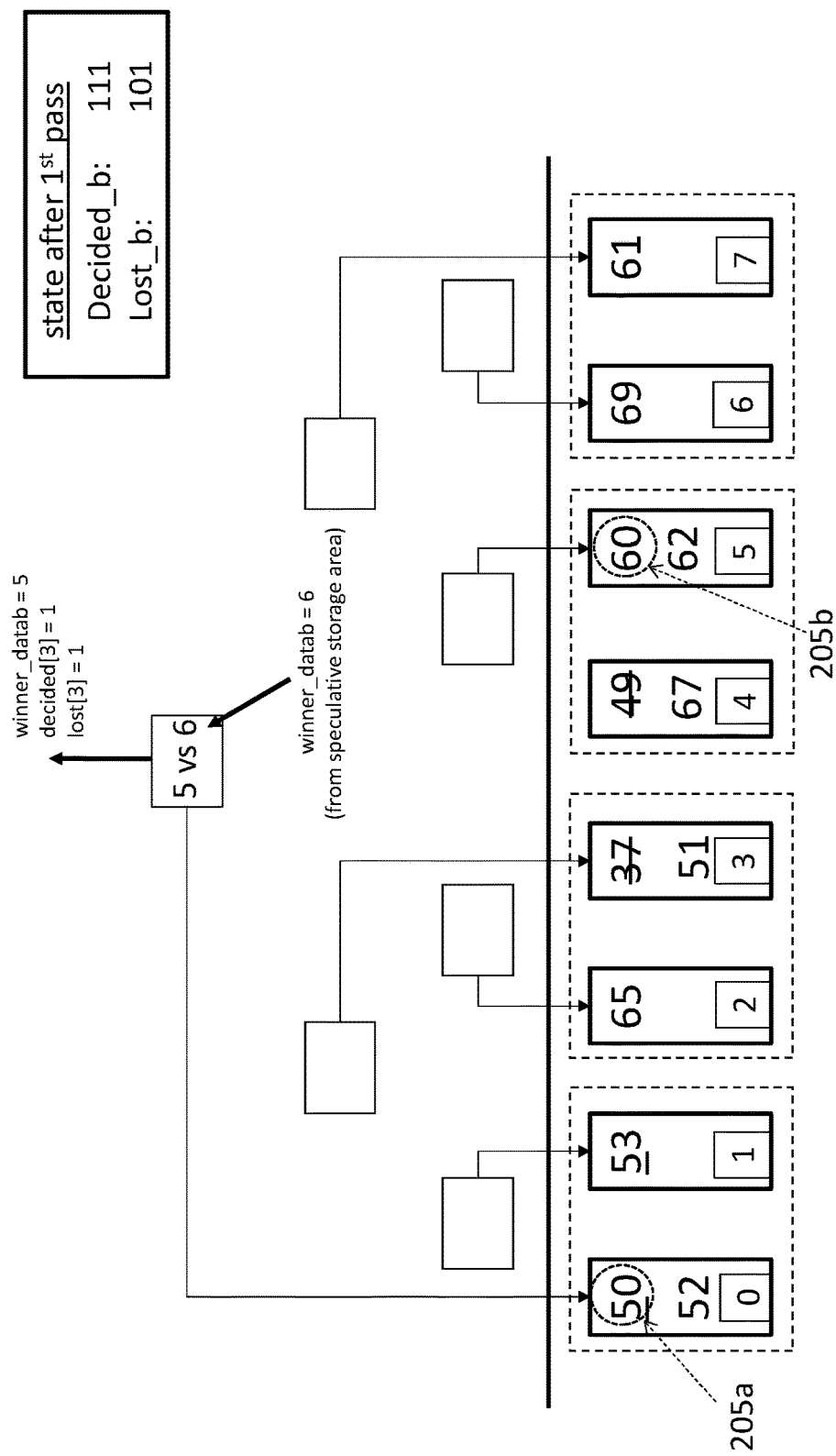
FIG. 2M illustrates a first pass of a transition tournament according to a non-limiting embodiment.

At FIG. 2M, a first pass of speculative-non-speculative tournament, also referred to as a "transition tournament" is illustrated according to a non-limiting embodiment. Accordingly, "5" is determined to be the winner. At 2N, a second pass of speculative-non-speculative tournament is illustrated, during which "0" is determined as the winner.

Figure 2N:
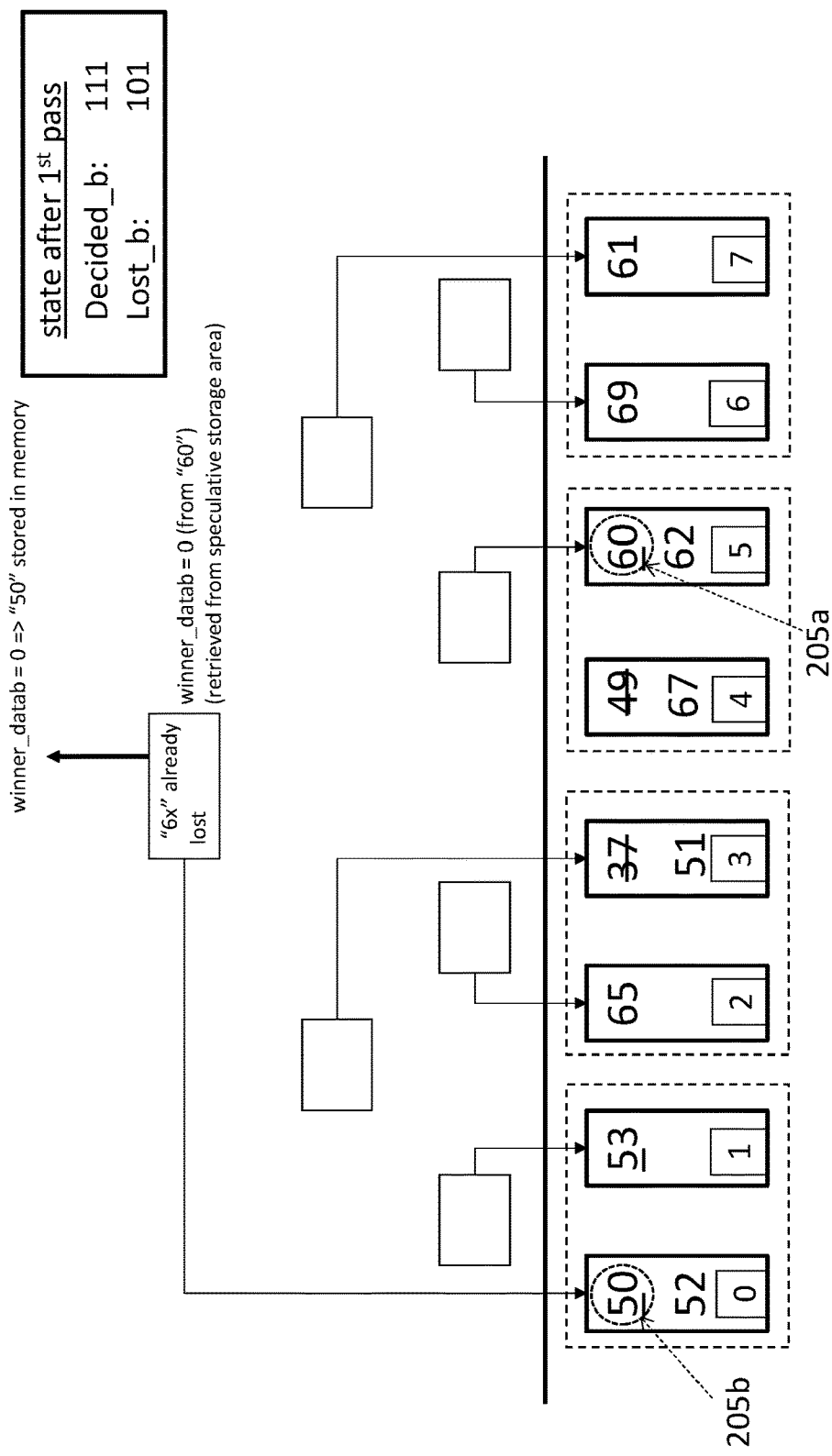
FIG. 2N illustrates a second pass of the transition tournament according to a non-limiting embodiment.
Figure 20:
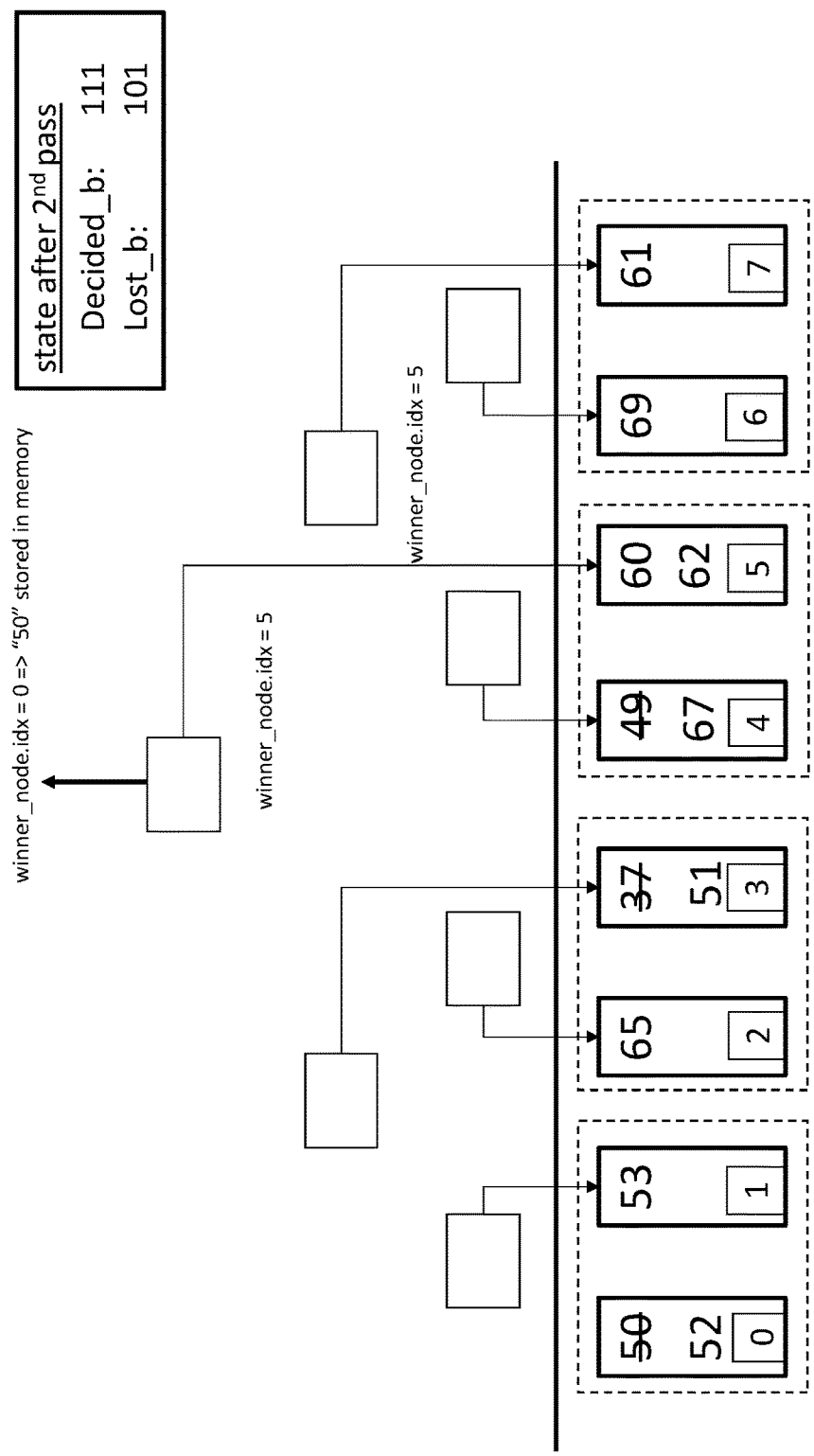
Figure 2P:
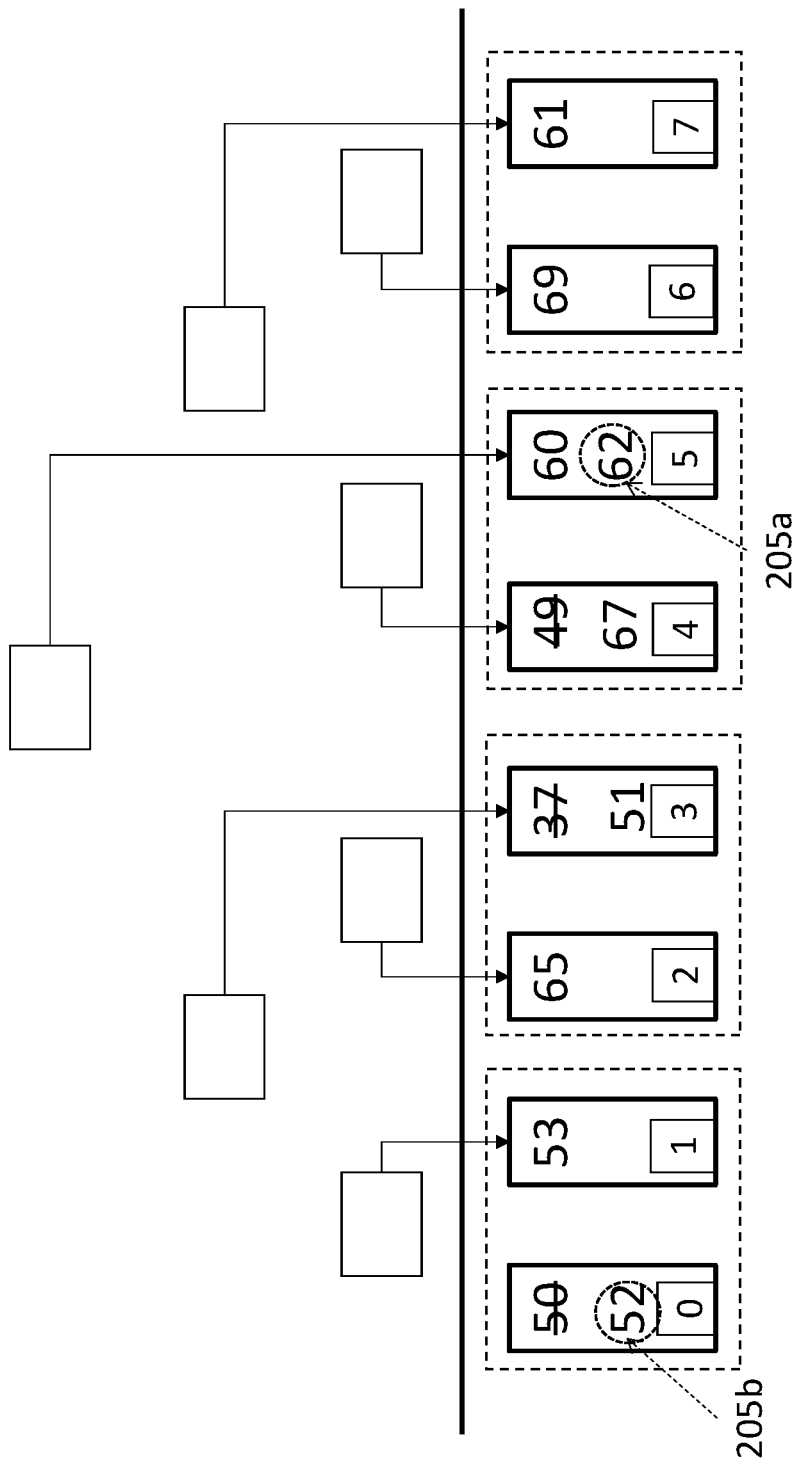
FIG. 2P illustrates the current state of the tournament following the next non-speculative and speculative tournament according to a non-limiting embodiment.

Accordingly, the overall winner "50" is ultimately stored in memory at FIG. 2O. FIG. 2N illustrates the subsequent state of the system with key value "62" selected as the next speculative tournament participant 205a while key value "52" is selected as the next non-speculative participant 205b.

Figure 3:
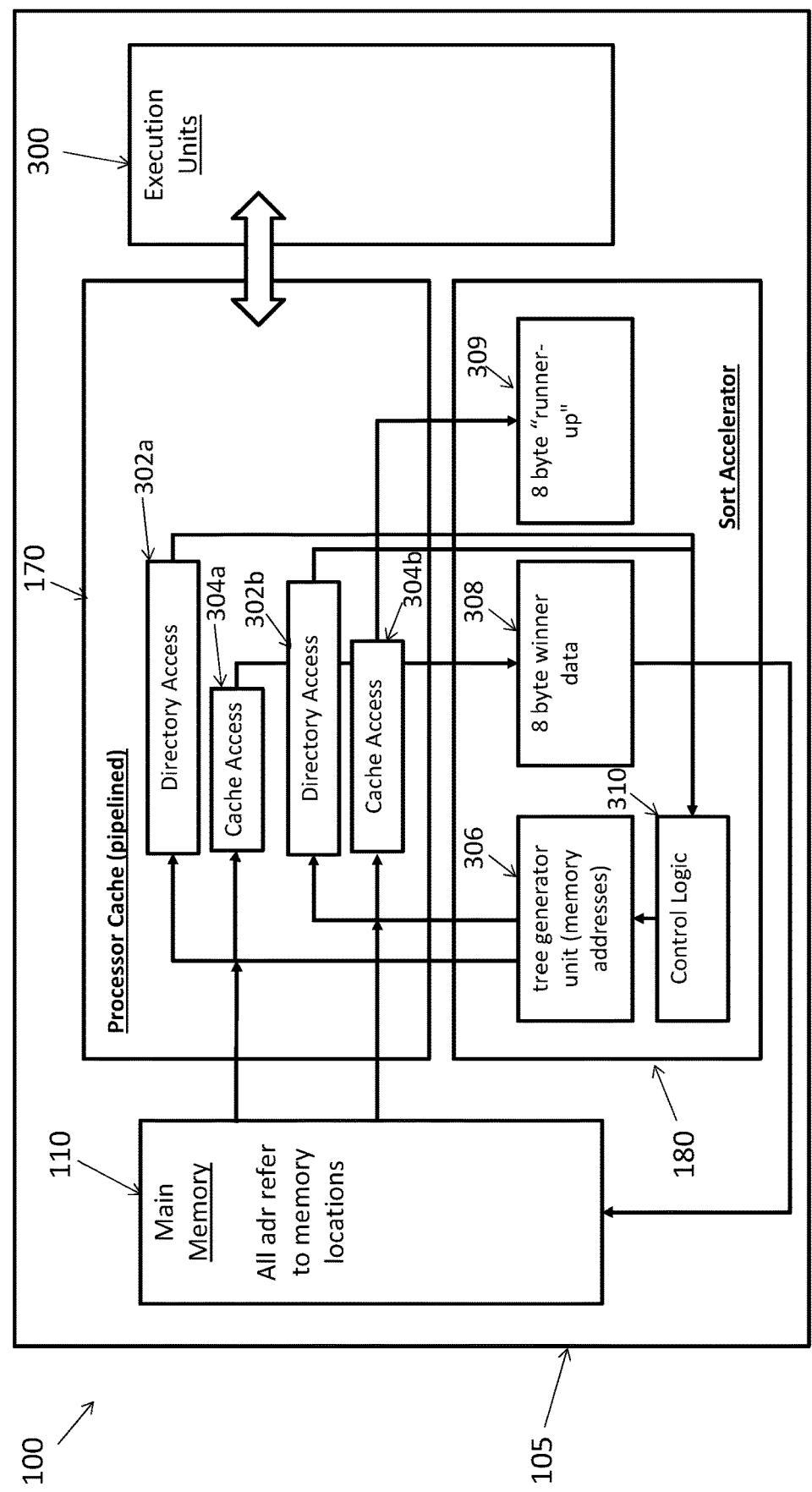
FIG. 3 is a block diagram illustrating a processor and sort accelerator according to a non-limiting embodiment.

Turning now to FIG. 3, a block diagram illustrates a connection between the processor 105 and the sort accelerator 180 according to a non-limiting embodiment. The processor 105 includes main memory or and access interface to off-chip memory 110, pipelined cache 170, and sort accelerator 180. The main memory 110 includes memory locations for storing sorted key values, including a sorted sequence of winners sorted according to results of a tournament sort tree executed by the sort accelerator 180. The pipelined cache 170 receives fetched values from the main memory 110, while also configured to exchange data with one or more pipeline execution units 300. The execution units 300 are configured to carry out various operations, along with executing instructions that facilitate data exchange between the pipelined cache 170 and the sort accelerator 180. In at least one non-limiting embodiment, the execution unit 300 can include a sense amplifier to detect the state of the signals on the bit lines, one or more arithmetic logic units, one or more floating point units, one or more load units, a store unit, and a control unit.

The pipelined cache 170 includes a plurality of directory access 302a and 302b, etc., each connected to a respective directory access 304a, 304, etc. In at least one embodiment, an individual directory access (e.g., 302a) and an individual directory access (e.g., 304) together form an access group. The pipelined cache 170 is configured to provide fast access to memory locations that store the data to be sorted (e.g., data keys). The data that is requested at the beginning of the pipeline will not be available until the end of the cache's data access pipeline. In at least one embodiment, the memory addresses to be read are known at least as many cycles ahead of time as there as stages in the cache's pipeline. In the tournament sort described herein, all addresses from a leaf of the tree to its root are known ahead of time making it particularly suitable for the pipelined cache 170.

The sort accelerator 180 includes a tree memory unit 306, a results memory unit 308, a top contender memory unit 309, and a logic controller 310. In at least embodiment, the tree memory unit 306 includes several individual ports, where each port is dedicated to providing a connection between the tree memory unit 306 and a respective access group (e.g., 302a/304a, 302b/304b, etc.). Accordingly, multiple data fetches (e.g., two data fetches) per cycle can be performed. In this manner, the data representing the "master" tournament tree and the "speculative" tournament tree can be fetched in parallel without having to consume additional memory to store data for two individual tournament trees.

The logic controller 310 generates addresses of a master tournament tree, which are stored in the tree memory unit 306 and utilized to perform a first tournament or "master" tournament. The addresses can then be used to perform the second tournament or "speculative" tournament without requiring storage of two separate and individual tournament trees. As mentioned above, multiple data fetches (e.g., two data fetches) can be performed per cycle. Accordingly, an initial tournament (i.e., "master tournament") and a speculative tournament can be performed in parallel, without requiring the memory to store excessive data corresponding to two separate tournaments trees. That is, data corresponding to a single master tournament tree can be stored in memory and used to perform the initial tournament and the speculative tournament in parallel with one another.

Previous results from a given tournament, (e.g., previous losers and/or winders of a match) can be retrieved from a cache access group 304a, 304b, etc.), loaded in the results memory unit 308, and utilized to perform a current match (e.g., comparison between two digits) between a pair keys included in the tournament tree. Once the match of a given tournament is complete, the results can be again stored to the cache 170, and new results data (e.g., another previous winner) can be loaded in the results memory unit 308 to perform another match. In this manner, the sort accelerator 180 is not required to store all the results of from the tournament, but only the key data of the keys participating in a current match.

Figure 4:
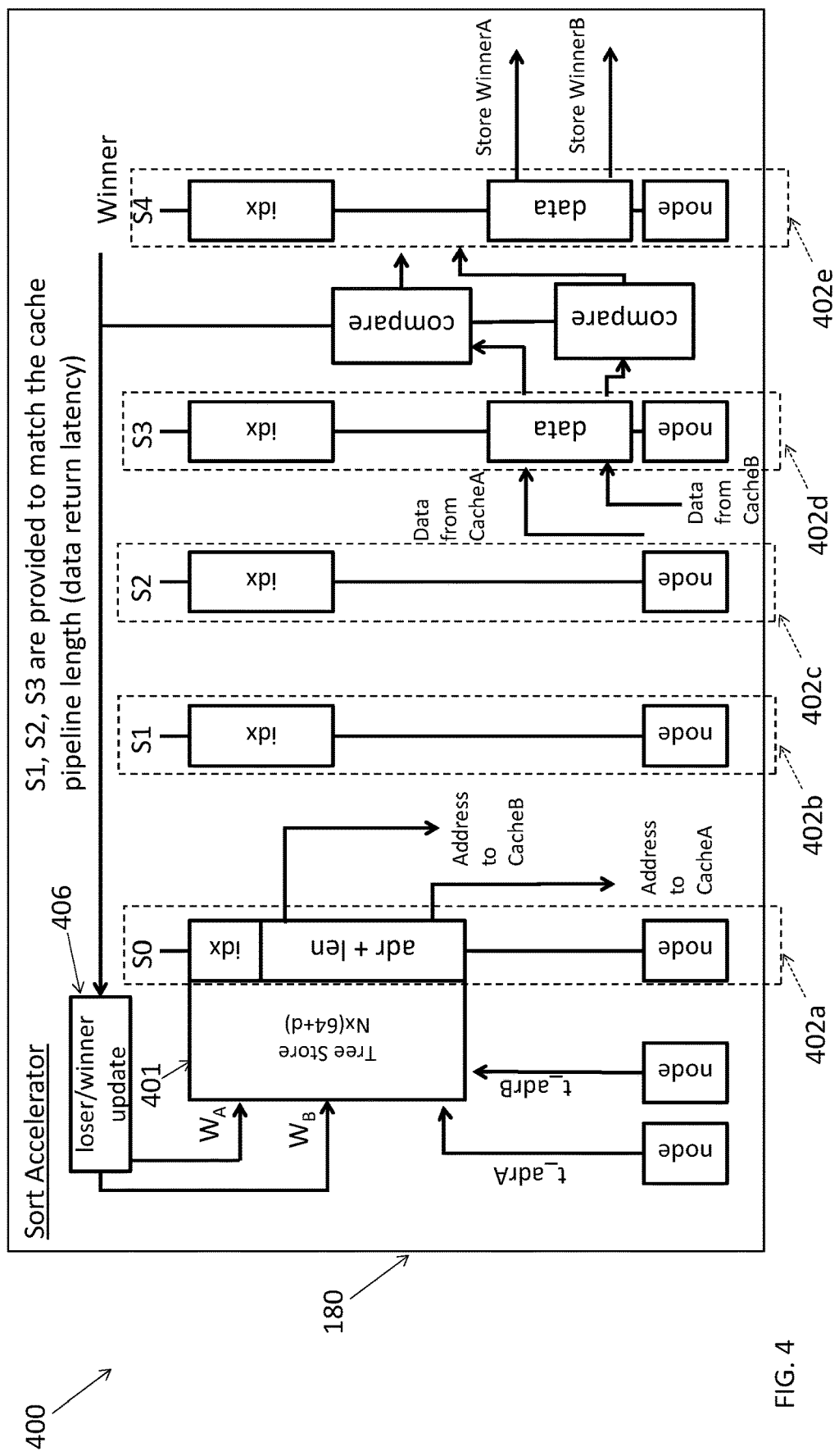
FIG. 4 is a merge sort accelerator pipeline diagram according to a non-limiting embodiment.
Figure 5A:
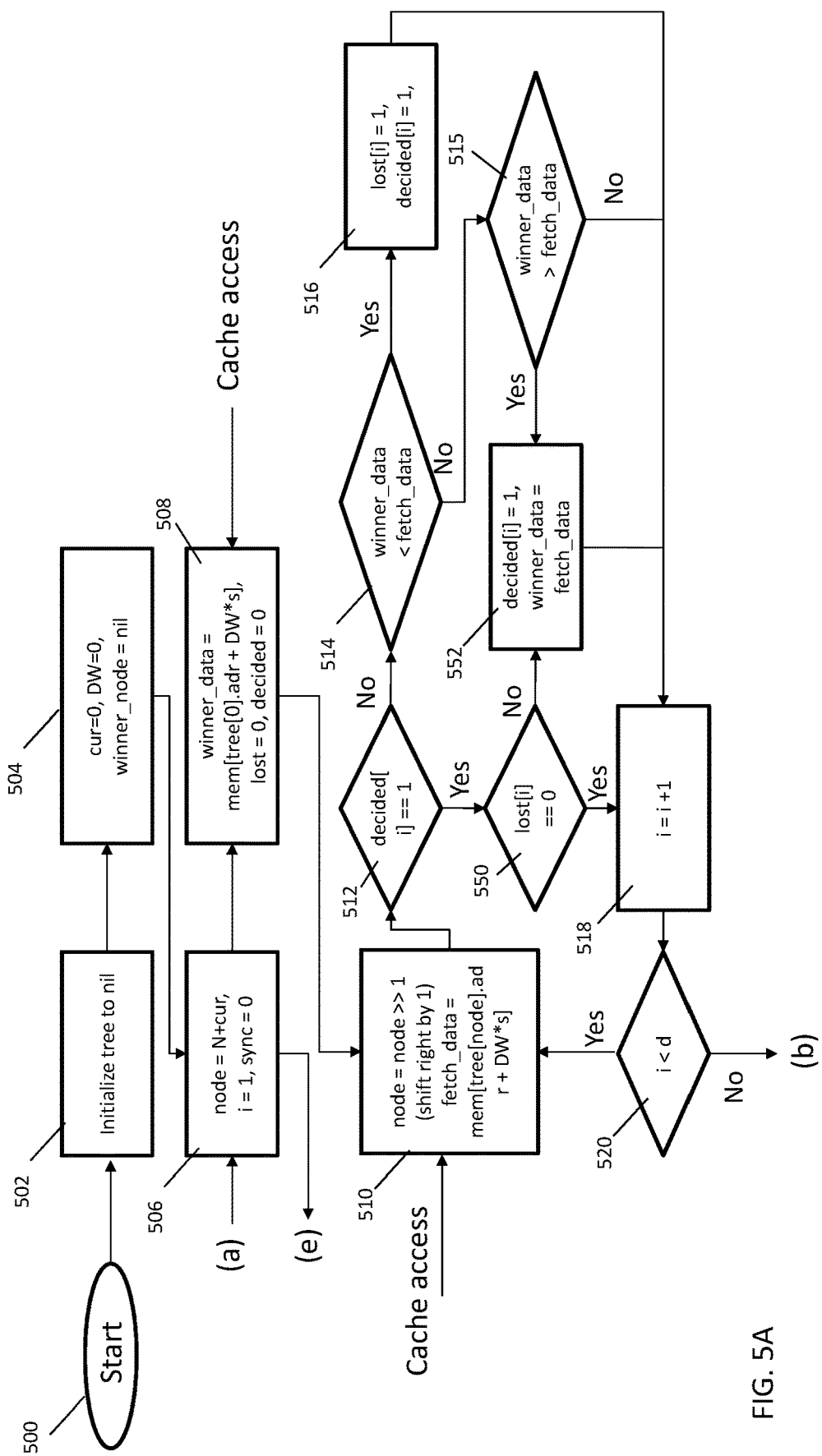
FIGS. 5A-5F illustrate a flow diagram of a partial compare tournament sort according to a non-limiting embodiment.
Figure 5B:
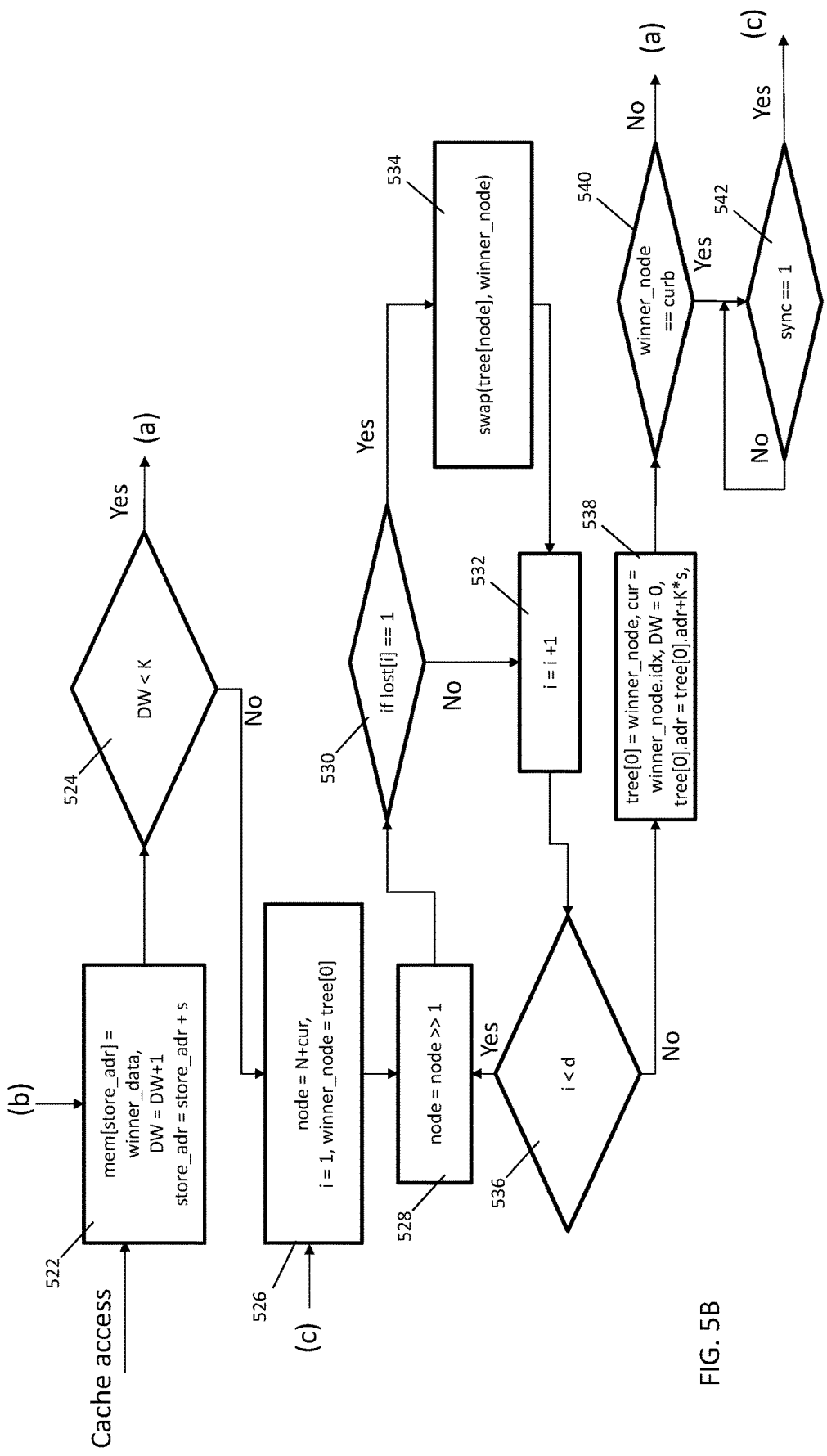
Figure 5C:
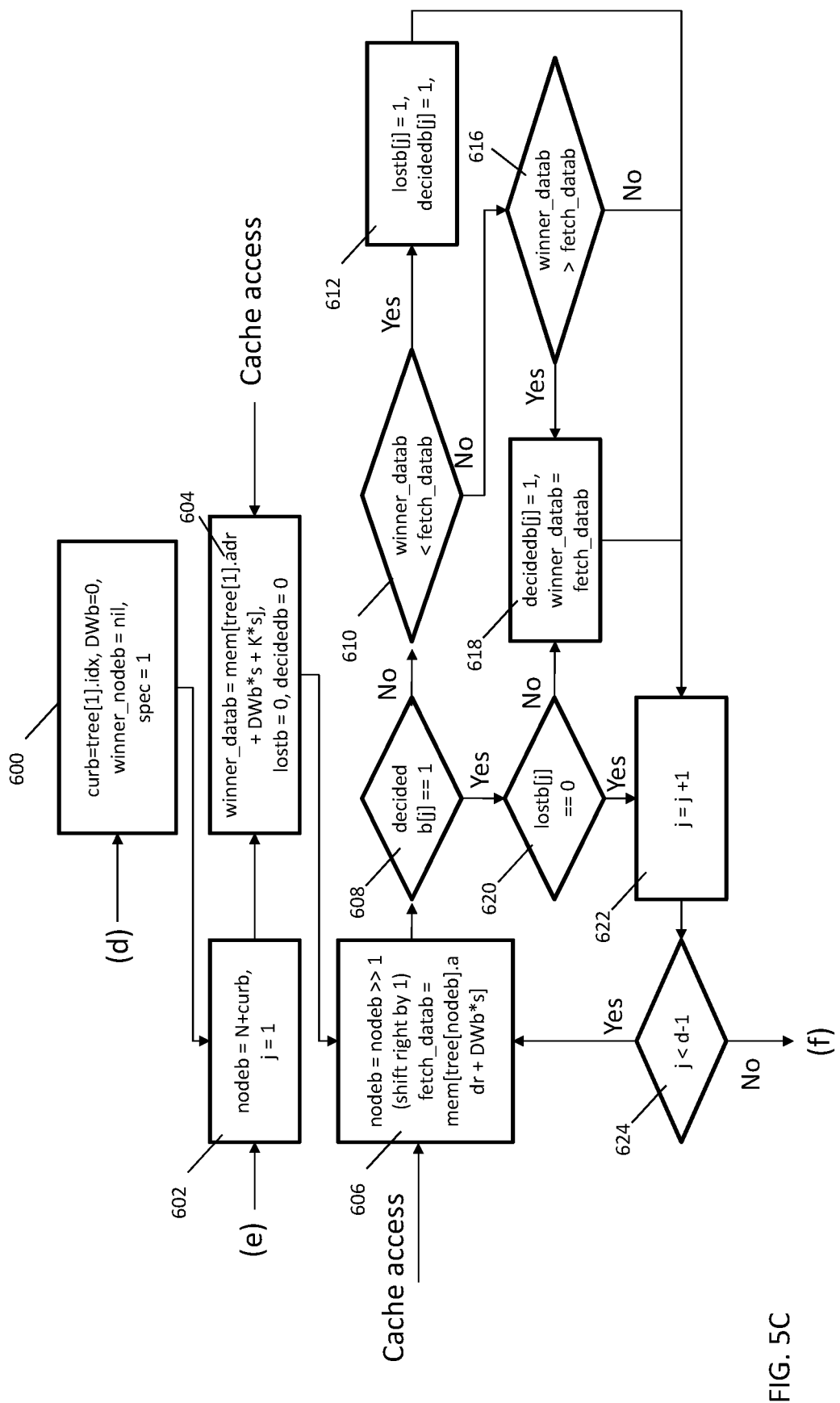
Figure 5D:
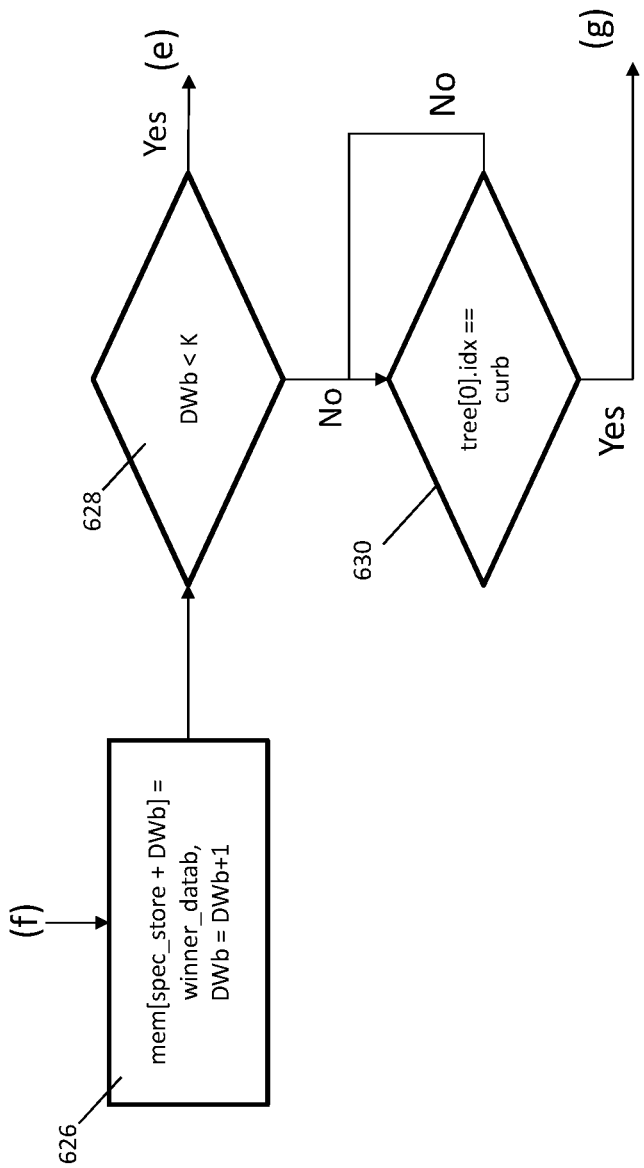
Figure 5E:
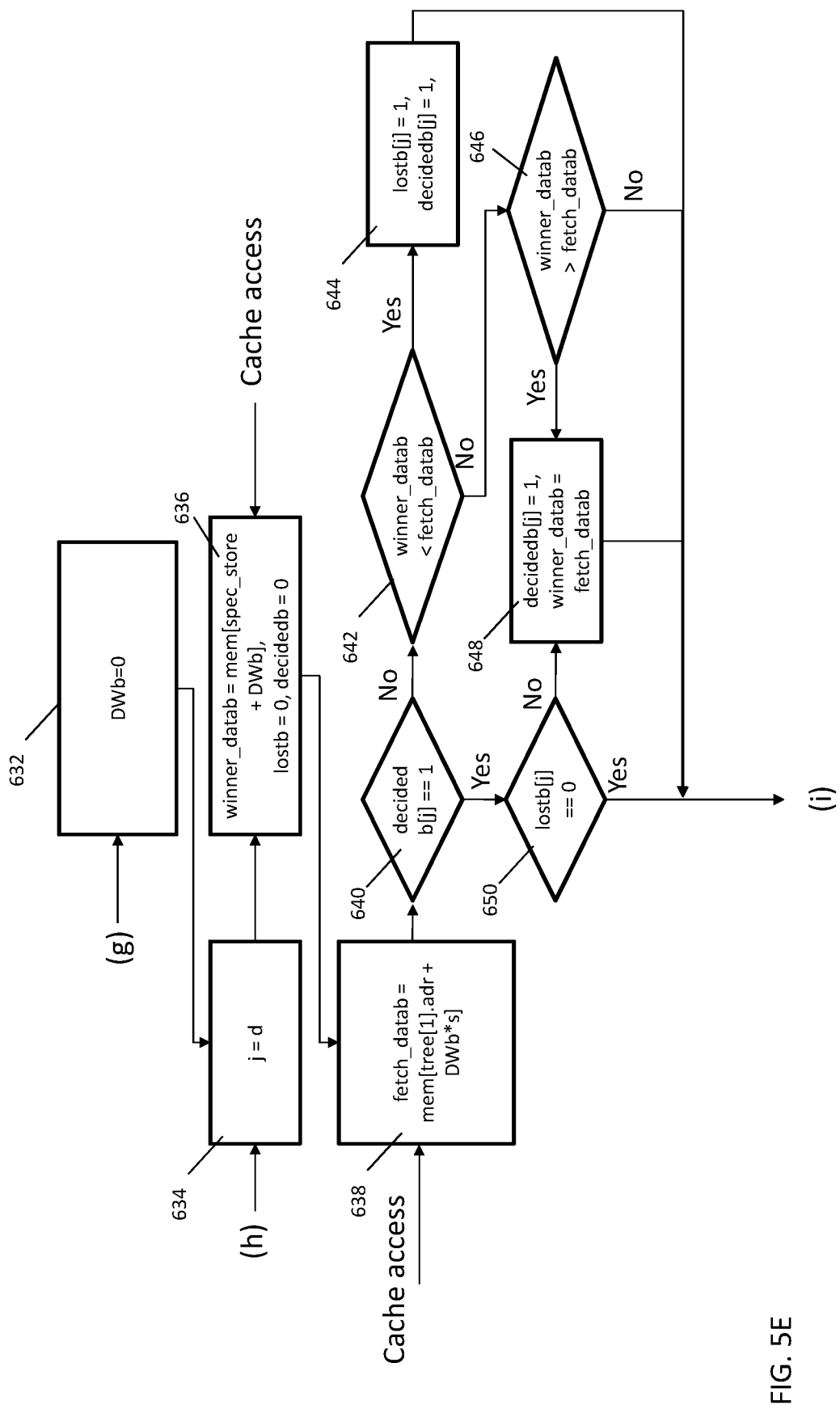
Figure 5F:
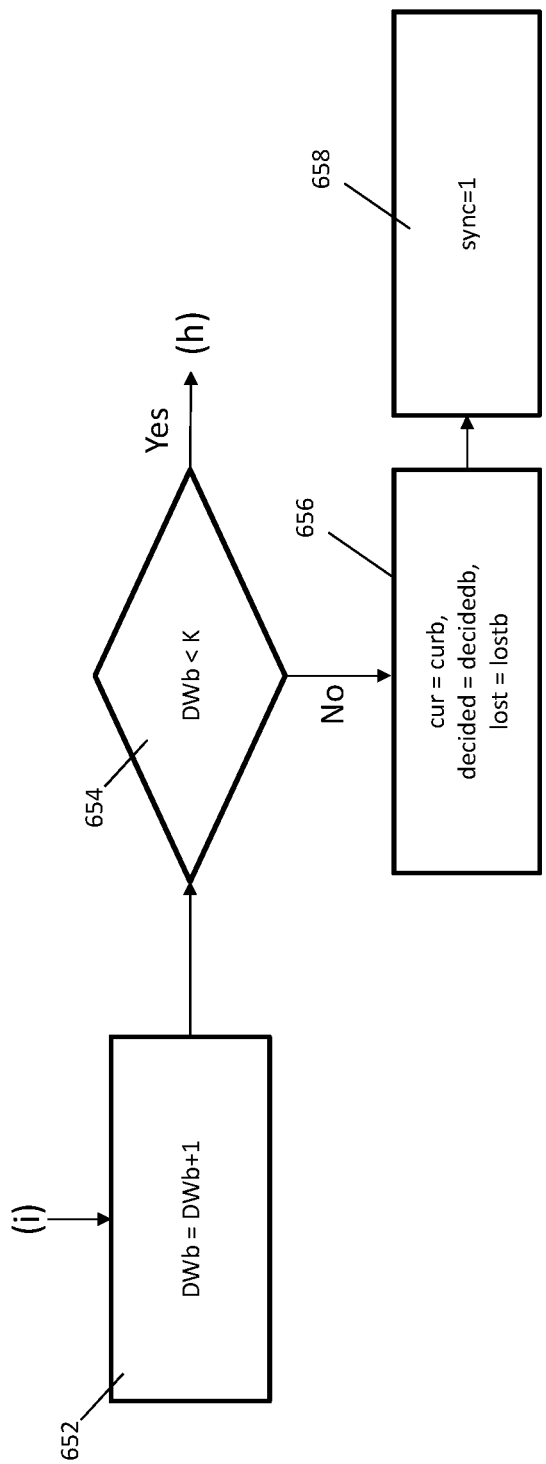

Turning now to FIG. 4, a merge sort accelerator pipeline 400 of a merge sort accelerator 180 configured to perform a partial compare tournament sort is illustrated according to a non-limiting embodiment. The pipeline 400 includes a memory array 401, and five individual pipeline stages 402a, 402b, 402c, 402d, and 402e. Although a five-stage pipeline is illustrated, the sort accelerator 180 is not limited thereto and can have more or fewer pipelines.

The memory array 401 stores the addresses defining the tournament tree used to perform partial compare tournament sort. The first pipeline stage 402a reads the addresses/length and index of the key elements participating the tournament sort tree and delivers the addresses to the cache 170 to determine the key elements associated with a given address. The second pipeline stage 402b and third additional pipeline stages 402c are provided to improve data exchange latency. Although two additional pipeline stages (e.g., 402b and 402c) are illustrated, the merge sort accelerator pipeline 400 is not limited thereto and can have more or less additional pipeline stages.

The fourth pipeline stage 402d receives the data from the cache 170 and delivers it to a comparator 404. In at least one embodiment, the data received from the cache 170 includes a first DW and a second DW. The first and second DWs can include, for example, a first digit from a first key and a second digit from a second key. The comparator 404 then performs the match by comparing the first digit to the second digit. In a lowest-winner tournament (i.e., loser-based tournament), for example, the lower digit is deemed the winner and is output to the fifth pipeline stage 402e. The comparator 404 also feeds the loser and/or winner back to an update register 406. The update register 406 implements the bits for the updated loser (UL) and decided vector (DV). The fifth pipeline stage 402e receives the "winner" of the comparison. The winner data is then stored from the merge sort accelerator pipeline 400 and stored it in the memory unit (e.g., memory 110) of the processor (e.g. 105). In this manner, space in the cache can be freed.

Turning now to FIGS. 5A-5F, a method of performing a parallel sort tournament is illustrated according to a non-limiting embodiment. The method begins at operation 500, and at operation 502 a tournament sort is initialized. The tournament sort tree is referred to as an array/list storing N nodes. Each node includes a tuple (idx, adr), where "idx" is a pointer to an input list and "adr" is the current start address of a key element stored in the main memory of the processor (see FIG. 7). The system advances up the sort tree (i.e., node=node>>1) by dividing by two or shifting right in binary code.

At operation 504, a current input list from which to take a next key element (e.g., DW) is obtained. In at least one embodiment, a key element is a DW, referring to a number of the "s byte" word that is processed in each key element. In addition, the winner node (i.e., the index and address of the winner of a previous run) is set to "nil" because no runs have yet been executed.

At operation 506, a node (e.g., an integer identifying an entry of the tree array/list) is selected based on the current input list from which to take the next element (i.e., node=N+cur). The current round or tree level ("i") is also set to 1 (i.e., i=1) such that a first non-speculative tournament sort begins at round 1 or at the first level of the tournament tree. At this stage, the method also proceeds to operation 602 and selects a current node to perform a speculative tournament, while still performing the current non-speculative tournament. The speculative tournament is described in greater detail below (See FIGS. 6C and 6D).

At operation 508, winner data (e.g., the 8-byte data word that is considered the winner) from a first match is determined. At operation 510, the winner advances to the next level of the tree (i.e., to the next match) by increasing the node of the tree 1 iteration (i.e., N+cur>>1), and a determination is made as to whether one or more given nodes along the current path has already been decided at operation 512.

When a given node proceeding along a tournament path is not decided, the method proceeds to operation 514 and determines whether the winner is less than the fetch data (i.e., the data fetched for comparisons (and potentially promoting to new winner data). When the winner data is less than the fetch data, the method proceeds to operation 516, and both the lost binary state vector and decided binary state vector are incremented (i.e., set to bit value "1"). Setting the lost binary state vector to "1" indicates that one or more given nodes along the tournament path have lost a match. At operation 518, the current round or tree level "i" is incremented by 1 iteration (i.e., "i=i+1"). Accordingly, a match (i.e., the next game) between two keys at the next level of the tree are performed.

When, however, a given node proceeding along a tournament path has been decided at operation 512, the method proceeds to operation 550 and a determination is made as to whether the node has lost its match. When the node has not lost its match, the decision binary state vector is set to 1 and the winner data is set as the fetch data at operation 552, and "i" is incremented by 1 iteration (i.e., "i=i+1") so as to advance to the next round or next tree level at operation 518.

Turning to operation 520, a determination is made as to whether "i" is less than the depth (d) of the tree (i.e., whether i<d). When "i" is less than "d", the method returns to operation 510, and the node is incremented by an iteration. When, however, "i" is not less than "d", the method proceeds to operation 522 (see FIG. 6B) to store the data value that through the series of comparisons has been determined to correspond to the winner's data value. (Even if the winner is not unambiguously determined, i.e. multiple nodes have equivalent values, then the equivalence implies that this value is the correct value no matter which node will be the overall winner.)

At operation 522, winner data corresponding to the overall winning key of the initial non-speculative tournament is stored in the memory of the main memory of the processor, and the key element (e.g., DW) is incremented (e.g., DW=DW+1). At operation 524, a determination is made as to whether the current key element (e.g., DW) is less than the total number of key elements (K) participating in the tournament sort. When DW is less than K, the method returns to operation 506. When, however, DW is not less than K, the method proceeds to operation 526 and the next node is selected (i.e., node=N+cur).

At operation 528, the node is incremented (i.e., node=N+cur_>>1). At operation 530, a determination is made as to whether "i" has lost. When "i" has not lost, "i" is incremented (i.e., i=i+1) at operation 532. When, however, "i" has lost, the method swaps the sorted locations of the current node and the winner node (i.e., the node that defeated "i") at operation 534, and "i" is incremented (i.e., i=i+1) at operation 532.

Turning to operation 536, a determination is made as to whether "i" is less than the depth (d) of the tree (i.e., whether i<d). When "i" is less than "d", the method returns to operation 528 and increments the current node (i.e., node=node>>1). When, however, "i" is not less than "d", the method proceeds to operation 538 to determine where to start next sort (i.e., DW=0" start with first digit again), and proceeds to increase the address of the list by K*s bytes to now point to the next element of the list. In other words, the method determines where to begin the sort for the next key/element from the unsorted lists.

At operation 540, synchronization operations are invoked that synchronize the speculative tournament with the non-speculative tournament. As described above, in some scenarios the key selected to participate in the speculative tournament may be correctly speculated as the next winner, while in other scenarios the key selected to participate in the speculative tournament may ultimately lose to another key value. Accordingly, when the winner of the speculative tournament is not the selected key (i.e., not the speculated winner), the method returns to operation 506, and another non-speculative tournament is initiated.

When, however, the winner of the speculative tournament is the selected key (i.e., the speculated winner), the method proceeds to operation 542 and determines whether system has been updated with both the overall winner of the non-speculative tournament along with the overall winner of the speculative tournament. When the synchronization is complete (i.e., sync=1), then the method returns to operation 526 and selects the next node (i.e., node=N+cur) to participate in the next non-speculative tournament.

Figure 6:
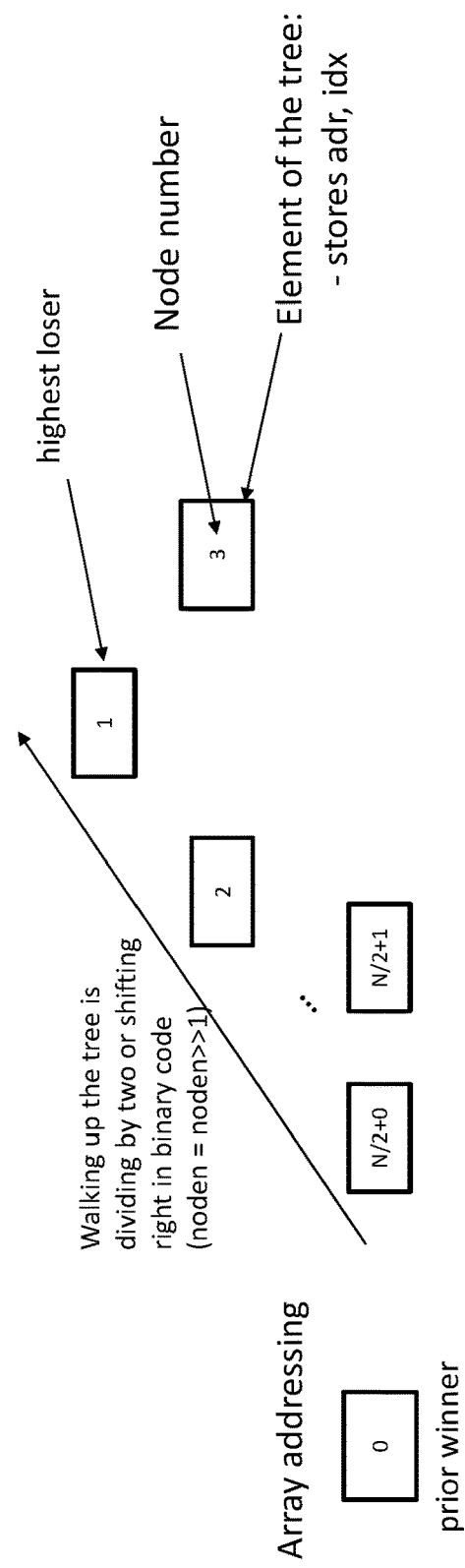
FIG. 6 is a block diagram illustrating properties of nodes included in a tournament tree employed by a partial compare tournament sort according to a non-limiting embodiment.

Turning now to FIGS. 6C and 6D, a flow diagram of a speculative tournament is illustrated according to a non-limiting embodiment. The speculative tournament is performed in parallel (i.e., at the same time) with the initial non-speculative tournament described above (see FIGS. 6A and 6B).

At operation 600, the speculative tournament is initialized by setting the current input list as the current results of the non-speculative tournament tree (i.e., curb=tree[1]). Accordingly, the non-speculative tournament and the speculative are working in parallel of the same tournament tree. At operation 602, a current node is selected to perform the speculative tournament in parallel with the on-going non-speculative tournament. At operation 604, winner data (e.g., the 8-byte data word that is considered the winner) from a first match of the speculative tournament is determined. At operation 606, the winner advances to the next level of the speculative tournament (i.e., to the next match) by increasing the node of the tree one iteration (i.e., nodeb=N+cur>>1), and a determination is made as to whether one or more given nodes along the current speculative tournament path has already been decided at operation 608.

When a given node proceeding along a speculative tournament path is not decided, the method proceeds to operation 610 and determines whether the winner is less than the fetch data (i.e., the data fetched for comparisons and potentially promoting to new winner data). When the winner data is less than the fetch data, the method proceeds to operation 612, and both the lost binary state vector and decided binary state vector are incremented (i.e., set to bit value "1"). Setting the lost binary state vector to "1" indicates that one or more given nodes along the speculative tournament path have lost a match. At operation 622, the current speculative tournament round "j" is incremented by 1 iteration (i.e., "j=i+1"). Accordingly, a match (i.e., the next game) between two keys at the next level of the speculative tournament are performed.

When, however, a given node proceeding along a speculative tournament path has been decided at operation 608, the method proceeds to operation 620 and a determination is made as to whether the node has lost its match. When the node has not lost its match, the decision binary state vector is set to "1" and the winner data is set as the fetch data at operation 618, and "i" is incremented by one iteration (i.e., "i=i+1") so as to advance to the next round or next tree level at operation 622.

Turning to operation 624, a determination is made as to whether "j" is less than second highest level of the tree (i.e., whether j<d−1). When "j" is less than "d−1", the method returns to operation 606, and the node is incremented by an iteration. When, however, "j" is not less than "d−1", the method proceeds to operation 626 (see FIG. 6D) to store the overall winner key value of the speculative tournament and increment the next speculative key element (e.g., DWb=DWb+1).

At operation 628, a determination is made as to whether the current selected speculative key element (e.g., DWb) is less than the total number of key elements (K) participating in the speculative tournament sort. When DWb is less than K, the method returns to operation 602. When, however, DWb is not less than K, the method proceeds to operation 630 and waits until a speculation is true, i.e., until a selected key value of the speculative tournament ends up winning the speculative tournament. When the speculation is determined to be true at operation 630, the method proceeds to operation 632.

At operation 632, a transition tournament or speculative-non-speculative tournament is initiated between the overall winner of the non-speculative tournament and the overall winner of the speculative tournament. At operation 634, the current speculative tournament round is set to the highest depth ("d") of the tournament tree. At operation 636, winner data from the speculative tournament is obtained. At operation 638, the key value of the (new) top contender in the top of the tree at location 1 is loaded (while the speculation was done, this node was occupied by the node used to initiate the speculation until that node itself became a winner). At operation 640 a determination is made as to whether one or more given nodes along the tournament path has already been decided. The term "j" also indicates the depth and is used to show how the existing register for j can be reused.

When a given node proceeding along the tournament path is not decided, the method proceeds to operation 642 and determines whether the winner is less than the fetch data (i.e., the data fetched for comparisons and potentially promoting to new winner data). When the winner data is less than the fetch data, the method proceeds to operation 644, and both the lost binary state vector and decided binary state vector are incremented (i.e., set to bit value "1"). Setting the lost binary state vector to "1" indicates that one or more given nodes along the speculative tournament path have lost a match.

When, however, a given node proceeding along the tournament path has been decided, the method proceeds to operation 650 and a determination is made as to whether the node has lost its match. When the node has not lost its match, the decision binary state vector is set to "1".

At operation 652, the next speculative key element is selected by incrementing the current speculative key value (e.g., DWb=DWb+1). At operation 654, a determination is made as to whether the current selected speculative key element (e.g., DWb) is less than the total number of key elements (K) participating in the tournament sort. When DWb is less than K, the method returns to operation 634. When, however, DWb is not less than K, the method proceeds to operation 656 to perform a final update (e.g., transfers the winning data of the speculative tournament into the non-speculative tournament), and the method synchronizes the data at operation 658. The synchronization mechanism is not limited to the simple hand-shake used in this example, and can involve asynchronous interface protocols, special circuitry or any other method that creates an atomic barrier that orders two or more parallel circuit implementations.

The present invention may be a system, a method, and/or a computer program product at any possible technical detail level of integration. The computer program product may include a computer readable storage medium (or media) having computer readable program instructions thereon for causing a processor to carry out aspects of the present invention.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer processor comprising:
   a memory unit configured to store key values to be sequentially sorted;
   a processor cache configured to obtain tree data from the memory unit indicating the key values;
   a hardware merge sort accelerator in signal communication with the memory unit and the processor cache, the merge sort accelerator configured to:
      generate a master tournament tree based on the key values;
      perform a tournament sort that determines a first winning key value based on the master tournament tree; and
      speculate a second winning key value based on the master tournament tree, wherein the speculated second winning key value is a next sequential winning key value of the tournament sort,
      wherein a first portion of tournament results is stored in the processor cache while a second portion of the tournament results is excluded from the processor cache.

2. The computer processor of claim 1, wherein each key value represents a numeral including a plurality of digits, and
   wherein the merge sort accelerator performs the tournament sort by performing a first tournament to determine a first digit of an overall winning key value and using the master tournament tree to speculate a first digit of the next sequential winning key value in parallel with determining the first digit of the overall winning key value.

3. The computer processor of claim 2, wherein the merge sort accelerator determines the first portion of the tournament results based on a winning digit of a particular match between a first digit of a first key value and a first digit of a second key value different from the first key value.

4. The computer processor of claim 3, wherein the merge sort accelerator determines the winning digit as a lowest value among a comparison between digits of the first and second key values of a given match.

5. The computer processor of claim 4, wherein the merge sort accelerator determines the overall winning key value of the first tournament by selecting a key value from the tournament results and performing a plurality of passes through the master tournament tree using the selected key value.

6. The computer processor of claim 5, wherein the processor cache is located separately and externally from the merge sort accelerator, and
   wherein the overall winning key value and the speculated second winning key value are stored in parallel from the merge sort accelerator to the memory unit.

7. The computer processor of claim 6, wherein the overall winning key value and the speculated second winning key value are automatically stored sequentially with respect to one another.

8. A computer-implemented method of sorting a plurality of data values stored in a hardware computer processor, the method comprising:
   storing, in a memory unit of the computer processor, key values to be sequentially sorted with respect to one another;
   obtaining, via a processor cache, tree data from the memory unit indicating the key values;
   generating, via a hardware merge sort accelerator, a master tournament tree based on the key values; and
   generating, via the merge sort accelerator, a master tournament tree based on the key values; and
   performing, via the merge sort accelerator, a tournament sort that determines a first winning key value based on the master tournament tree and speculates a second winning key value based on the master tournament tree, wherein the speculated second winning key value is a next sequential winning key value of the tournament sort; and
   storing a first portion of tournament results in the processor cache while excluding a second portion of the tournament results from the processor cache.

9. The method of claim 8, further comprising:
   representing each key value as a numeral that includes a plurality of digits, wherein performing the tournament sort further comprises:
   executing a first tournament to determine a first digit of an overall winning key value; and
   using the master tournament tree to speculate a first digit of the next sequential winning key value in parallel with determining the first digit of the overall winning key value.

10. The method of claim 9, wherein the first portion of the tournament results is based on a winning digit of a particular match between a first digit of a first key value and a first digit of a second key value different from the first key value.

11. The method of claim 10, wherein determining the winning digit is based on a lowest value among a comparison between digits of the first and second key values of a given match.

12. The method of claim 11, further comprising determining the overall winning key value of the first tournament by selecting a key value from the tournament results and performing a plurality of passes through the master tournament tree using the selected key value.

13. The method of claim 12, wherein determining the overall winning key value of the first tournament includes selecting a key value from the tournament results and performing a plurality of passes through the master tournament tree using the selected key value.

14. The method of claim 13, further comprising:
storing the overall winning key value and the speculated second winning key value in parallel from the merge sort accelerator to the memory unit; and
updating the memory unit in response to the storing such that the overall winning key value and the speculated second winning key value are automatically stored sequentially with respect to one another.

15. A computer program product to control an electronic computer processor to sort data, the computer program product comprising a computer readable storage medium having program instructions embodied therewith, the program instructions executable by the electronic computer processor to perform operations comprising:
storing, in a memory unit of the computer processor, key values to be sequentially sorted with respect to one another;
obtaining, via a processor cache, tree data from the memory unit indicating the key values;
generating, via a hardware merge sort accelerator, a master tournament tree based on the key values;
generating, via the merge sort accelerator, a master tournament tree based on the key values; and
performing, via the merge sort accelerator, a tournament sort that determines a first winning key value based on the master tournament tree and speculates a second winning key value based on the master tournament tree, wherein the speculated second winning key value is a next sequential winning key value of the tournament sort, wherein performing the tournament sort comprises:
performing a first tournament to determine a first digit of an overall winning key value;
performing a second tournament to determine a second digit of the overall winning key value;
determining a first portion of tournament results based on a winning digit of a particular match between a first key value and a second key value different from the first key value; and
storing the overall winning key value and the speculated second winning key value in parallel from the merge sort accelerator to the memory unit,
wherein the winning digit is determined according to a comparison between a first digit of the first key value and a first digit of the second key value.

16. The computer program product of claim 15, the program instructions further executable by the electronic computer processor to perform operations comprising:
representing each key value as a numeral that includes a plurality of digits, wherein performing the tournament sort further comprises:
executing a first tournament to determine a first digit of an overall winning key value; and
using the master tournament tree to speculate a first digit of the next sequential winning key value in parallel with determining the first digit of the overall winning key value.

17. The computer program product of claim 16, the program instructions further executable by the electronic computer processor to perform operations comprising:
updating the memory unit in response to the storing such that the overall winning key value and the speculated second winning key value are automatically stored sequentially with respect to one another.

* * * * *